(12) United States Patent
Peck

(10) Patent No.: US 9,434,320 B2
(45) Date of Patent: *Sep. 6, 2016

(54) SAFARI BICYCLE RACK

(71) Applicant: GIRAK LLC, Salt Lake City, UT (US)

(72) Inventor: Nate Peck, Bluffdale, UT (US)

(73) Assignee: GIRAK LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,238

(22) Filed: Oct. 29, 2015

(65) Prior Publication Data

US 2016/0046242 A1 Feb. 18, 2016

Related U.S. Application Data

(63) Continuation of application No. 14/055,685, filed on Oct. 16, 2013, now Pat. No. 9,187,046.

(51) Int. Cl.
*B60R 9/00* (2006.01)
*B60R 9/048* (2006.01)
*B60R 9/10* (2006.01)
*B60R 9/04* (2006.01)
*B60R 7/10* (2006.01)

(52) U.S. Cl.
CPC . *B60R 9/10* (2013.01); *B60R 9/04* (2013.01); *B60R 7/10* (2013.01); *B60R 9/00* (2013.01); *B60R 9/048* (2013.01); *Y10T 29/49826* (2015.01)

(58) Field of Classification Search
CPC .................................. B60R 9/04; B60R 9/10
USPC ................. 224/309, 319, 324, 330
See application file for complete search history.

(56) References Cited

U.S. PATENT DOCUMENTS

| | | | |
|---|---|---|---|
| 3,437,248 A * | 4/1969 | Allen | B60R 9/10 224/309 |
| 4,538,752 A * | 9/1985 | Welter | B60R 9/00 224/309 |
| 5,037,019 A * | 8/1991 | Sokn | B60R 9/00 224/403 |
| 5,381,939 A * | 1/1995 | Tippets | B60R 9/06 224/309 |
| 5,492,259 A * | 2/1996 | Tippets | B60R 9/00 224/309 |
| 5,611,590 A * | 3/1997 | Filgueiras | B60J 3/0208 296/97.1 |
| 6,167,735 B1 * | 1/2001 | Brown | B60R 9/048 211/5 |
| 6,367,673 B1 * | 4/2002 | Smith | B60R 9/00 224/403 |
| 6,398,091 B1 * | 6/2002 | Munoz | B60R 9/10 224/402 |
| 6,755,332 B2 * | 6/2004 | Crane | B60R 9/00 224/321 |
| 7,458,624 B1 * | 12/2008 | Bower | B60P 3/07 296/61 |
| 2005/0082324 A1 * | 4/2005 | Schlachter | B60R 9/10 224/319 |
| 2007/0018485 A1 * | 1/2007 | Jacobson | B60J 1/2013 296/210 |
| 2012/0193380 A1 * | 8/2012 | McMurtrie | B60R 9/08 224/324 |

* cited by examiner

*Primary Examiner* — Justin Larson
*Assistant Examiner* — Lester L Vanterpool

(57) ABSTRACT

A safari bicycle rack, method for making the safari bicycle rack, and method for mounting a bicycle to the safari bicycle rack on an exposed roll can include: providing the bicycle rack comprising: a crossbar having an elongate longitudinal length section with laterally curved end sections extending from each side of the longitudinal length, the crossbar having a top side that includes one or more bicycle receivers and having a length sufficient to extend across the roll cage; and a mounting bracket on an end of each laterally curved end section, the mounting brackets each being planar and having an aperture extending through the bracket from a top surface to an opposite bottom surface, the mounting brackets each having bottom surface received on the roll cage with fastener extending through each aperture and a vertical hole in the longitudinal bars such that the crossbar is elevated off the longitudinal bars.

20 Claims, 16 Drawing Sheets

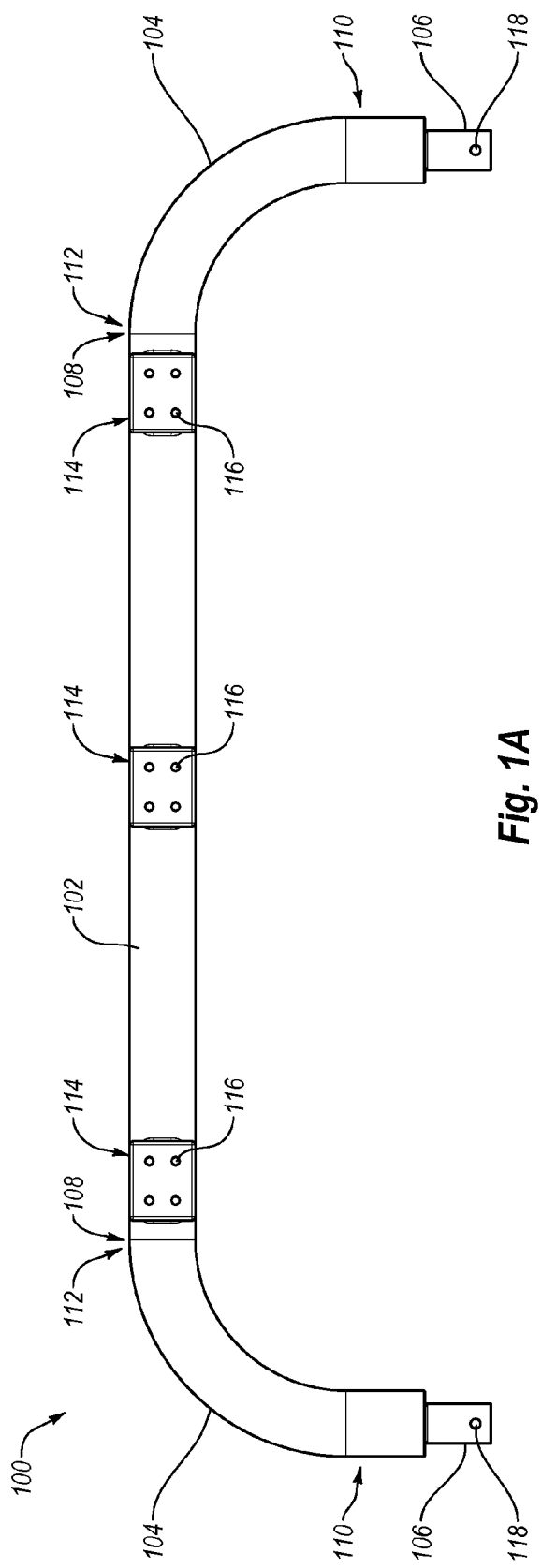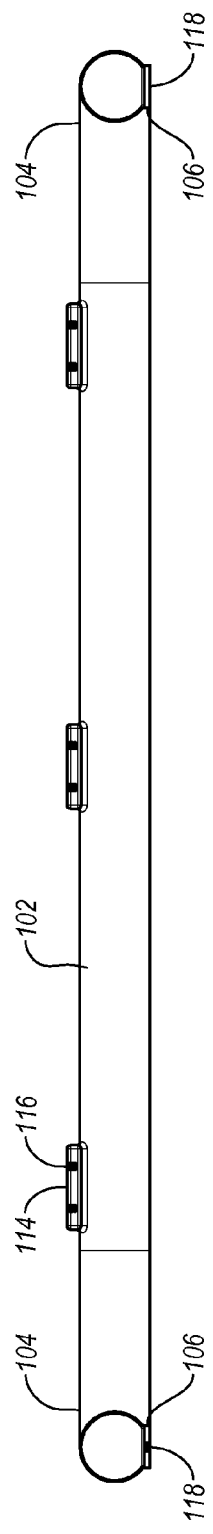
Fig. 1A
Fig. 1B

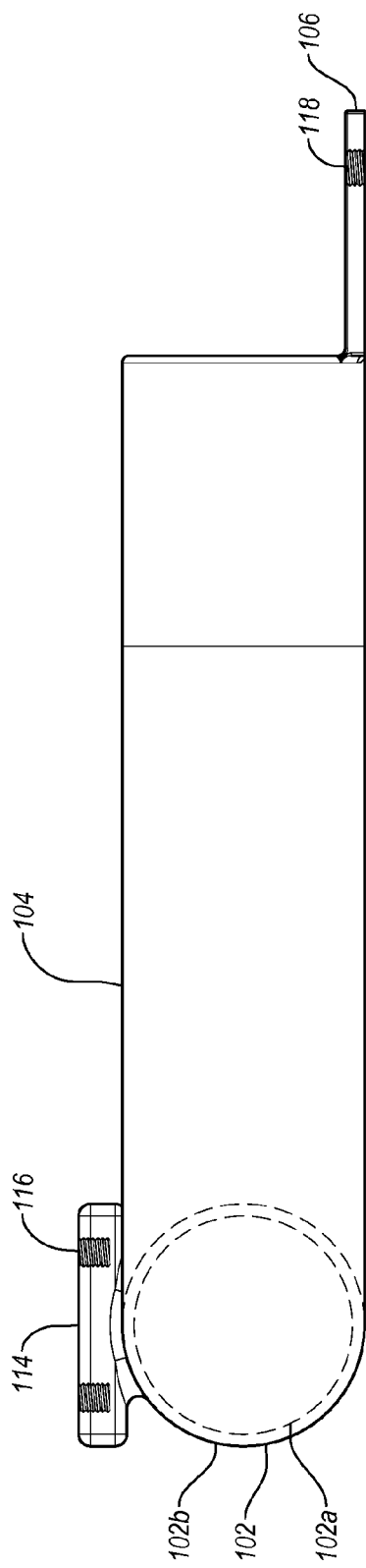
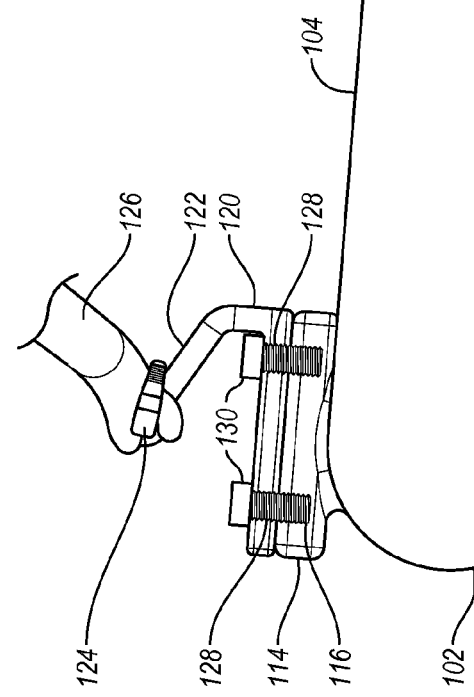
Fig. 1C
Fig. 1D

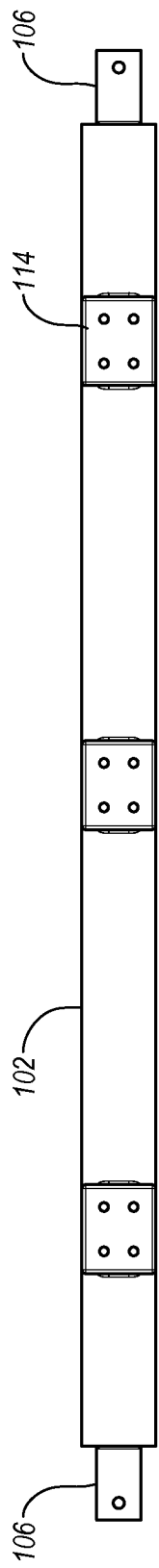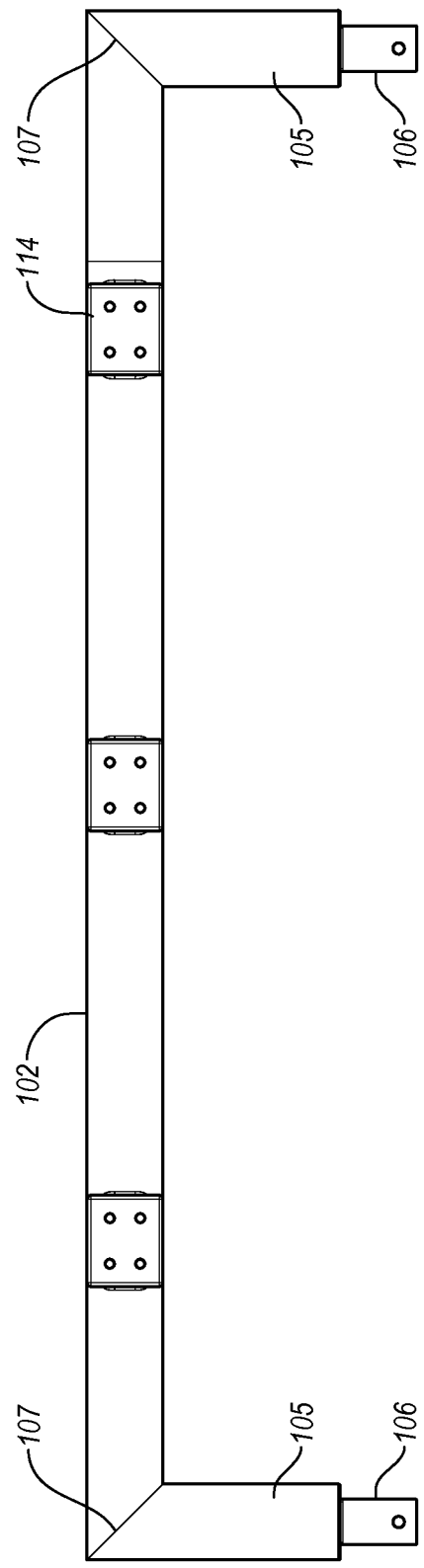
Fig. 1F
Fig. 1G

SAFARI BICYCLE RACK

CROSS-REFERENCE TO RELATED APPLICATIONS

This application is a continuation of patent application Ser. No. 14/055,685 filed Oct. 16, 2013 entitled BICYCLE RACK, the contents of which are hereby incorporated by reference herein.

BACKGROUND

Bicycle racks on vehicles are common for carrying a bicycle outside of the vehicle. Different types of bicycle racks are available. For example, there are bicycle racks that are configured to be mounted to vehicle roof rails, onto roof racks, into trailer receivers, and other locations. While many bicycle racks are available, there are still vehicles and vehicle accessories that have not had a bicycle rack tailored to be useable with the vehicle or vehicle accessory. Accordingly, it can be difficult to transport a bicycle when a sufficient bicycle rack is not available for some vehicles or vehicle accessories. As such, there remains a need in the art for additional bicycle racks and bicycle rack system configurations.

SUMMARY

In one embodiment, a bicycle rack comprises: a crossbar having an elongate longitudinal length section with laterally curved end sections extending from each side of the longitudinal length, the crossbar having a top side that includes one or more bicycle receivers and having a length sufficient to extend across a roll cage of a vehicle; and a mounting bracket on an end of each laterally curved end section, the mounting brackets each being planar with an aperture extending through the bracket from a top surface to an opposite bottom surface, the mounting brackets each having bottom surface adapted to be received on a surface of a longitudinal bar of the roll cage with a fastener extending through each aperture and a vertical hole in the longitudinal bars such that the crossbar is elevated off the longitudinal bars or a plane extending between the surfaces of the longitudinal bars. In one aspect, the crossbar is elevated sufficiently such that the roll cage can include a soft top or bikini top without interference with the crossbar. In one aspect, the bicycle receivers are front fork receivers. In one aspect, the bicycle rack has the fastener extending through the aligned aperture of the mounting bracket and the hole of the longitudinal bars of the crossbar.

In one embodiment, the present invention includes a vehicle comprising the bicycle rack and the roll cage. In one aspect, the bicycle rack is mounted on the roll cage, wherein the bicycle rack is positioned relative to the roll cage such that a bicycle mounted to bicycle receivers of the bicycle rack has its rear wheel resting on the tailgate or rear-mounted spare tire. In one aspect, the vehicle has the bicycle received into the bicycle receivers with the rear wheel of the bike resting on the tailgate. In one aspect, the vehicle includes a strap received through the rear wheel of the bicycle and secured to the vehicle. In one aspect, the strap is received through a rim of a spare tire mounted to the rear of the vehicle.

In one embodiment, the present invention is a roll cage having the bicycle rack mounted to the roll cage. In one aspect, the bicycle rack is positioned relative to the roll cage such that a bicycle mounted to bicycle receivers of the bicycle rack has its rear wheel extending past the roll cage when the roll cage is mounted in the vehicle. In one aspect, the bicycle is received into the bicycle receivers with the rear wheel of the bicycle extending past the roll cage.

In one embodiment, the present invention includes a method of mounting a bicycle rack to a roll cage, the method comprising: providing the bicycle rack and roll cage; mounting the mounting brackets of the bicycle rack to the roll cage such that the longitudinal length section of the crossbar is extended from the surface of the top longitudinal bars of the roll cage by the angle of the laterally curved end sections and bottom surface of the mounted brackets and so that the laterally curved end sections locate the crossbar toward the rear of the roll cage relative to the hole in the top longitudinal bar.

In one aspect, the mounting includes: inserting the fastener through each of the aligned apertures of the mounting brackets and vertical hole in the longitudinal bar; and fastening the mounting brackets to the top longitudinal bars of the roll cage. In one aspect, the roll cage is mounted in a vehicle having the roll cage exposed, the method comprising: positioning the crossbar so that a front fork of a bicycle received into the bicycle receivers positions a rear wheel of the bicycle onto a tailgate of the vehicle.

In one embodiment, the present invention includes a method for mounting a bicycle to a bicycle rack on an exposed roll cage of a vehicle, the method comprising: providing a vehicle having an exposed roll cage and tailgate external to the roll cage and having a bicycle rack coupled to the exposed roll cage, the bicycle rack comprising: a crossbar having an elongate longitudinal length section with laterally curved end sections extending from each side of the longitudinal length, the crossbar having a top side that includes one or more bicycle receivers and having a length sufficient to extend across the roll cage of the vehicle; a mounting bracket on an end of each laterally curved end section, the mounting brackets each being planar with an aperture extending through the bracket from a top surface to an opposite bottom surface, the mounting brackets each having bottom surface received on a surface of a longitudinal bar of the roll cage with a fastener extending through each aperture and a vertical hole in the longitudinal bars such that the crossbar is elevated off the longitudinal bars or a plane extending between the surfaces of the longitudinal bars; and mounting a bicycle to one of the bicycle receivers on the crossbar such that the rear wheel of the bicycle rests on the tailgate of the vehicle.

In one embodiment, the front fork of the bicycle is received into the bicycle receivers, wherein the bicycle receivers are configured to receive the front fork of the bicycle. The method can include coupling the rear wheel of the bicycle to a rear portion of the vehicle. In one aspect, the method can include gripping a handle mounted to the roll cage while lifting the bicycle onto the roll cage. In one aspect, the method can include coupling the bicycle rack to the roll cage such that when mounting the bicycle to one of the bicycle receivers on the crossbar the rear wheel of the bicycle rests on the tailgate of the vehicle.

In one embodiment, the method can be performed by resting the rear wheel of the bicycle on the tailgate before and during mounting the bicycle to one of the bicycle receivers on the crossbar.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 1, and 1A-1G show embodiments of bicycle racks adapted to be mounted to an exposed roll cage of a vehicle.

DETAILED DESCRIPTION

Figure 1:
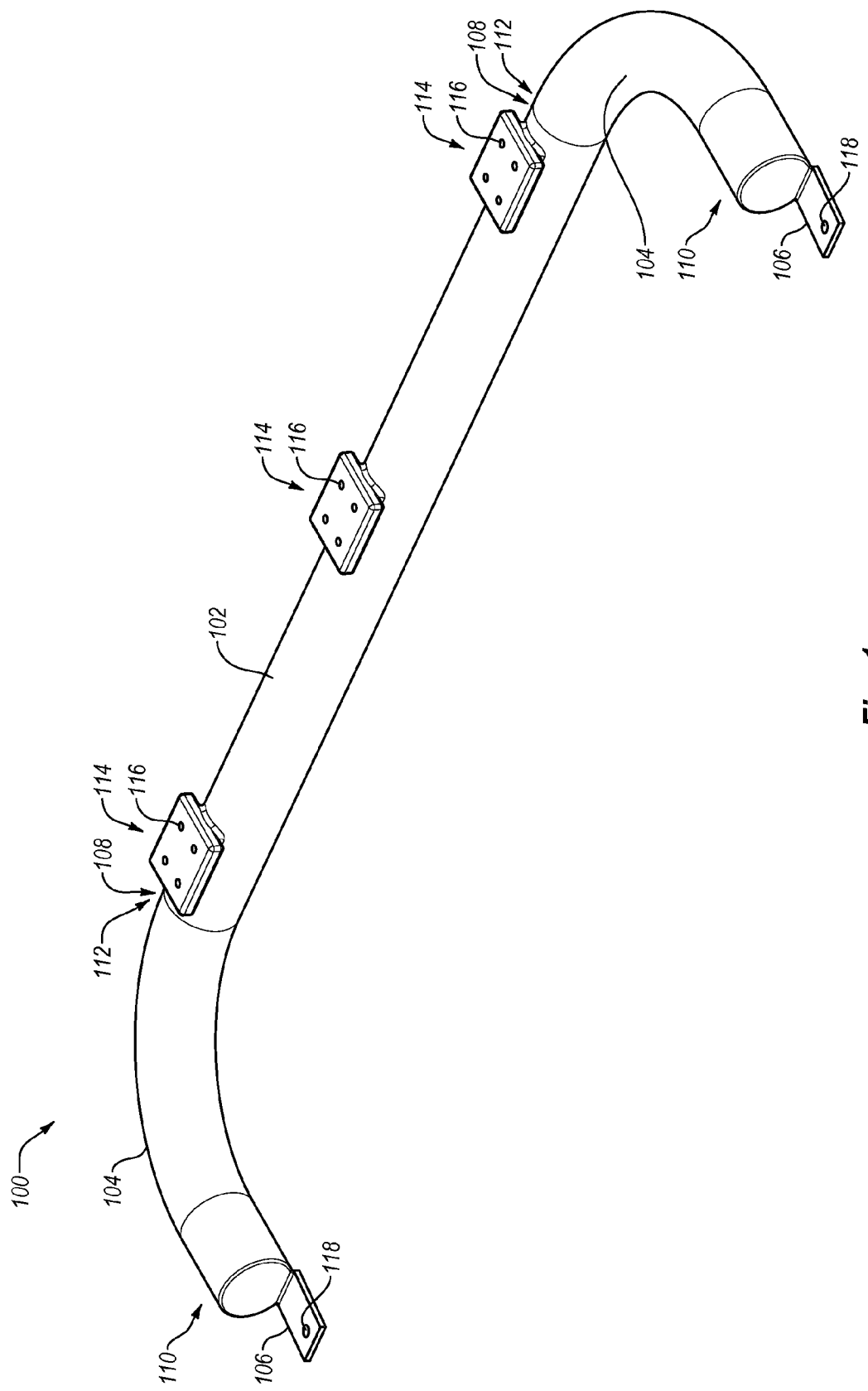

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present invention includes bicycle rack systems that are adapted to be mounted to exposed roll cages of vehicles, such as sport utility vehicles (e.g., Jeep Wrangler®). The bicycle rack can be mounted to predrilled vertical holes in the exposed roll cage or mounted to the bar or mounted to later-drilled holes. The bicycle rack is dimensioned so that the front fork of a bicycle is received into the bicycle rack with the rear wheel resting on the tailgate. The bicycle rack systems are especially adapted to vehicles with exposed roll cages, such as the commercially available Jeep Wrangler®; however, the bicycle rack described herein can also be mounted to safari racks, roof racks, or any other rack or vehicle accessory within reason.

Recently, it was realized that many stock roll cages of recent model Jeep Wranglers® include a top longitudinal bar extending along each of the sides from a front or middle lateral crossbar to right and left down bars that are mounted to the body of the Jeep Wrangler®, where each top longitudinal bar includes a predrilled hole between the speakers and down bar, where the predrilled hole extends from the top to bottom surfaces of the roll cage tube. In many observed instances when the roll cage included a tubular protective pad, the predrilled hole is uncovered and exposed, with the tubular pads leaving a space around the predrilled hole. When the hard top is removed from the Jeep Wrangler®, the predrilled holes in the top longitudinal bars are exposed. Also, removing the hard top also removes vehicles accessories (e.g., bicycle or safari racks) attached thereto. In many instances, a soft top or bikini top is used as roofing; however, it is difficult to mount a bicycle rack to a soft top or bikini top, and many bicycle rack adaptations are not sufficient for desirable bike mounting needs on a Jeep Wrangler®. However, the pre-drilled holes in the top longitudinal bars are exposed when soft tops or bikini tops are installed. As such, the pre-drilled holes can be used for mounting a bicycle rack to the roll cage of a Jeep Wrangler®, even when the soft top or bikini top is installed. According, the inventors have invented a bicycle rack system that is mounted to the roll cage, such as by mounting the bicycle rack to the pre-drilled holes. A novel bicycle rack system was invented to include a crossbar that extends between the predrilled holes, where one or more (e.g., 2 or 3 or 4) bicycle receivers are mounted on a top surface of the crossbar, and where the bottom of the crossbar is suspended above a soft top or bikini top, and where the crossbar is positioned longitudinally with respect to the roll cage such that the rear wheel can rest on the tailgate or rear-mounted spare tire. As such, for an adult bicycle, such as a mountain bike, road bike, cyclocross bike, cruiser, jump bike with a wheel size of from 24-36 inches, such as 24, 26, 28, 29 inch rims has sufficient distance from one side across the diameter to the other side to rest on the tailgate. In order to have the front of the bike properly positioned above the crossbar with the rear of the bike resting on the tailgate, the crossbar includes a lateral extending member extending from each end. The lateral extending members include a mounting bracket that has an aperture dimensioned to be aligned with the predrilled holes and receive a fastener through both the mounting bracket and roll cage in order to fasten the bicycle rack to the roll cage. In one example, the positioning of the crossbar allows the front forks of a bicycle to be mounted to the crossbar (e.g., via a front fork receiver) with the attached rear wheel resting on the tailgate.

It is noted that adult bicycles are dimensioned larger than kids-sized bikes, and the present invention is intended for larger-sized bikes. However, embodiments that include adjustable positioning configurations may be useful for the entire range of bike sizes from kid sizes (e.g., 12, 16, 18, 20, and 22 inches) to adult sizes (e.g., anything larger than 24 inches). As such, the embodiments having the adjustable longitudinal length can be configured to carry all bikes within reason with the front fork mounted to the crossbar and the rear wheel resting on the tailgate of the vehicle. As such, Jeep Wrangler® dimensioned vehicles (referred to herein as sport utility vehicles) having the exposed roll cage can receive the bike rack so that the crossbar extends longitudinally and upwardly from the roll cage (e.g., top longitudinal bar) so as to be higher than and not touching a soft top or bikini top. However, the present invention is not limited to this embodiment, and these and other embodiments of the invention are provided as examples in the figures and following description.

FIGS. 1 and 1A-1C show an embodiment of a bicycle rack 100 that is configured to be mounted onto a support member, such as the roll cage of a jeep or safari rack, or other type of roof-mounted or roll-cage mounted rack. FIG. 1 shows a perspective view of the bicycle rack 100. FIG. 1A shows a top view of the bicycle rack 100, where orientation of top is relative to when mounted to the vehicle or vehicle accessory. FIG. 1B shows a long side of the bicycle rack 100 (e.g., showing crossbar 102) and FIG. 1C shows a short side of the bicycle rack 100 (e.g., showing curved extension member 104). The bicycle rack 100 includes a crossbar 102 that has a curved extension member 104 on each end (e.g., extension member ends 108). Each curved extension member 104 includes a mounting bracket 106 on each bracket end 110 of the curved extension member 104. As such, moving from one side to the other, the bicycle rack 100 includes a first mounting bracket 106 coupled to a bracket end 110 of a first curved extension member 104 with a crossbar end 112 of the first curved extension member 104 coupled to an extension member end 108 of the crossbar 102. The other extension member end 108 of the crossbar 102 is coupled to the crossbar end 112 of the second curved extension member 104 with the bracket end 110 of the second curved extension member 104 being coupled to the second mounting bracket 106.

It should be noted that the crossbar 102 and curved extension members 104 can be a single, unitary piece of material (e.g., metal) having all of these members, or can be one, two, three, or four separate pieces that are coupled, mated, linked, welded, brazed, threaded, screwed, snap-fit, or otherwise fastened and/or slid together. In one option, crossbar 102 is separate from the two curved extension members 104 and welded, threaded, or otherwise coupled together.

In another option shown in FIG. 1C, one curved extension member 104 is coupled to an inner crossbar 102a and a second curved extension member 104 is coupled to an outer crossbar 102b, and the inner crossbar 102a has an outer diameter that is smaller than the inner diameter of the outer crossbar 102b such that the inner crossbar 102a is slidably received into the lumen of the outer crossbar 102b, which allows the long length of the crossbar 102 to be extended or narrowed for adjustment to fit on a range of vehicles or vehicle accessories. This is similar to telescoping members such that the inner crossbar 102a and outer crossbar 102b can be configured as a telescoping crossbar 102.

In any configuration, the crossbar 102 has a longitudinal axis along the long length, and the curved extension members 104 extend laterally therefrom. The curved extension members 104 may be substituted with straight extension members that extend laterally from the longitudinal axis of the crossbar 102. The extension members may have any shape, from straight to bent to curved, or the like, such that the mounting brackets 106 are extended laterally from the longitudinal axis of the crossbar 102. Also, the crossbar 102 can be arced or curved or have one or more bends; however, a straight crossbar 102 can be preferred.

The mounting brackets 106 can be unitary pieces with the extension members 104, such as by being prepared from a single piece of material. Alternatively, the mounting brackets 106 can be coupled to the extension members 104 similar to how the extension members 104 are coupled with the crossbar 102, such as by separate pieces that are coupled, mated, linked, welded, brazed, threaded, screwed, snap-fit, or otherwise fastened and/or slid together. In fact, the entire crossbar 102 with extension members 104 and mounting brackets 106 can be formed from a single piece of material that is shaped and configured as illustrated and described.

The crossbar 102 includes one or more mounting members 114, where three mounting members 114 are shown. While more than three mounting members 114 may be mounted on the crossbar 102, size may restrict the number of mounting members 114 on the crossbar 102. Also, size may limit to only two mounting members 114 on the crossbar 102. However, when using a combination of fork receivers and wheel receivers to mount the bicycles to the bicycle rack 100, three or more mounting members 114 may be usable because the difference in height of the bicycles on the fork receivers (e.g., lower) compared to the height of the bicycles on the wheel receivers (e.g., higher). The different configurations are discussed in more detail below. In any event, each of the one or more mounting members 114 are configured to receive a fork receiver configured to couple to a fork of a bicycle or receive a wheel receiver configured to couple to a wheel of a bicycle. Each of the mounting members 114 includes one or more mounting features 116 (e.g., holes to receive fastener shafts or fastener shafts to be received into holes), which may be holes or shafts or bolts or quick-release or other fastening components that can function as mounting features 116 to mount the mounting members 114 to the structure (e.g., fork receiver or wheel receiver) that couples with the bicycle. While four mounting features 116 are shown on each mounting member 114, any number can be used (e.g., 1, 2, 3, 4, 5, 6, etc.). The mounting members 114 can be configured to mount to any standard, unique, or other fork receiver and/or wheel receiver of common bike racks known or later developed.

The mounting brackets 106 can have various configurations to mount to a vehicle or vehicle accessory, such as a roll cage or safari rack or roof rack or luggage rack, or other roof-mounted vehicle accessory. As such, the mounting bracket 106 is a plate with a single aperture 118. However, other mounting features or components can be used that are known in mounting arts, such as bicycle rack mounting arts for mounting bicycle racks to vehicles or vehicle accessories. The aperture 118 can be dimensioned to receive a fastening member (e.g., see FIGS. 6A-6C), which fastening member can be any known in the mounting arts. In one embodiment, the fastening member for the aperture 118 can be a bolt that is received through the aperture (e.g., hole) in a roll cage with a nut or the like on the other end so that the bicycle rack 100 is mounted thereto. In another embodiment, the fastening member for the aperture 118 can be a quick-release fastener. In any event, substantially any type of fastener may be useful for mounting the mounting brackets 106 to the vehicle or vehicle accessory. However, some stock roll cages (e.g., stock roll cage for Jeep Wrangler®) come with pre-drilled holes that go through the pipe of the roll cage so that a fastener (e.g., bolt) can be passed through the aperture 118 of the mounting brackets 106 and through the pre-drilled hole in the roll cage, and the fastener can be fastened to mount the mounting brackets 106 to the roll cage, which mounts the bicycle rack 100 to the roll cage.

FIG. 1D shows a short side of the bicycle rack 100 having the crossbar 102 connected to the extension member 104 that is connected to the mounting bracket 106 having the aperture 118. The crossbar 102 includes the mounting member 114 with the mounting features 116. A fork receiver 120 is mounted to the mounting member 114, where the fork receiver 120 has a support section 122 that includes the fork receiver fastener 124 that fastens the fork 126 of a bicycle to the fork receiver 120. The fork receiver fastener 124 can be any fastener that is useful for mounting to a bicycle fork, such as at the grooves that receive the axle of the bicycle front wheel, which fork receiver fasteners 124 are well known in the art. The support section 122 may be capable of being moved, rotated, or otherwise articulated relative to the main portion of the fork receiver 120. The fork receiver 120 can include mounting features that mount with the mounting features 116 of the mounting member 114, but which can be any mounting features that can couple (removably or fixed) the fork receiver 120 to the mounting member 114. As shown, the fork receiver 120 includes apertures 128 that correspond with the mounting features 116 of the mounting member 114, where a combination of apertures and bolts can be used, with the bolts being the mounting features or the mounting features 116 being an aperture aligned with apertures 128 so that a fastening bolt 130 is received therethrough so as to be through the fork receiver 120 and mounting member 114. In any event, a fastening system can fasten the fork receiver 120 to the mounting member 114 so as to be coupled with the crossbar 102.

Figure 1E:
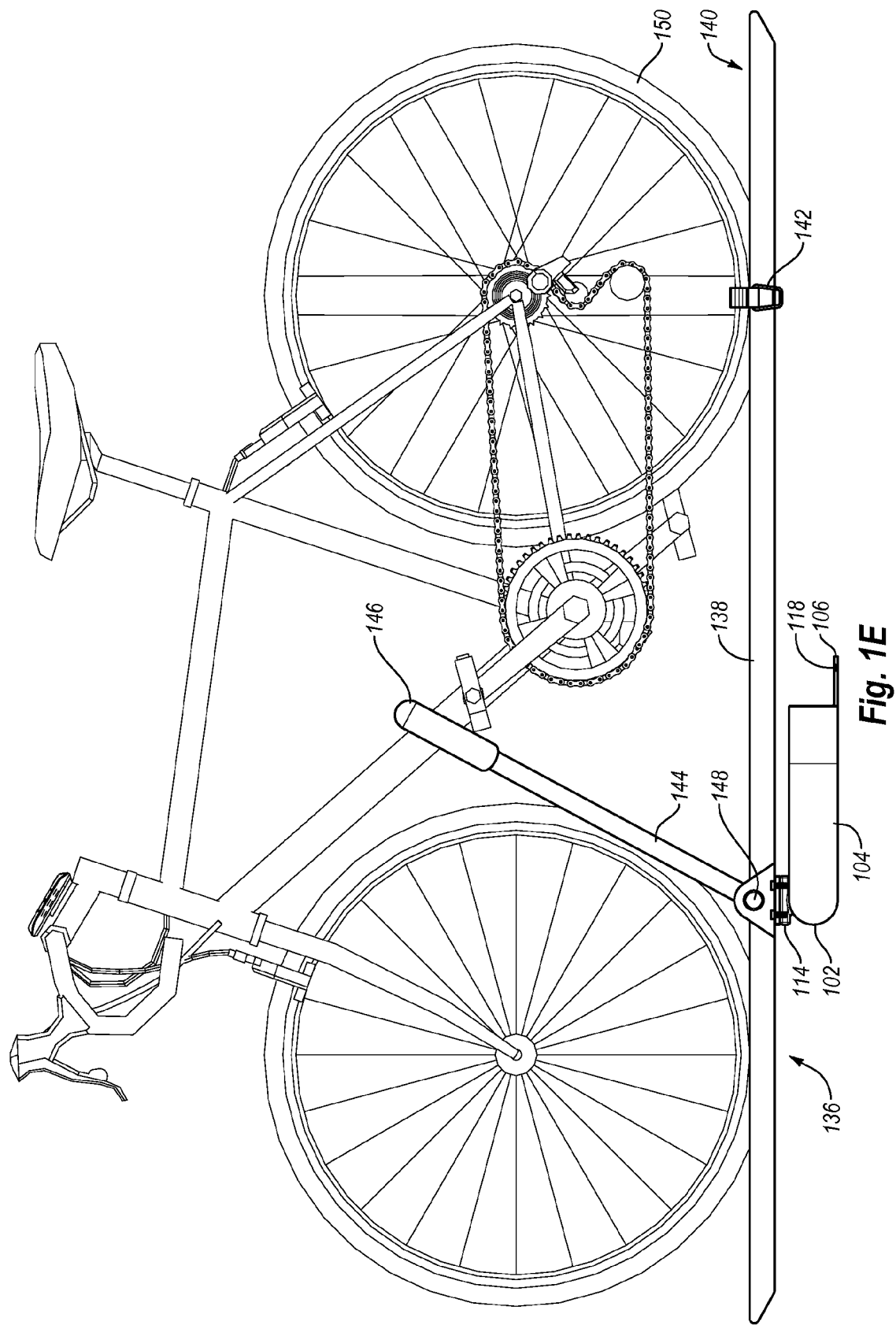

FIG. 1E shows the mounting member 114 being coupled to a wheel receiver 136 that is configured to receive a wheel 150 of a bicycle. Wheel receivers 136 that receive a wheel 150 of a bicycle so as to mount the bicycle are well known. The wheel receiver 136 includes an elongate member 138 with a trough 140 (not shown, but well known) that receives the wheel 150 of the bike within the trough 140. As such, the elongate member 138 has a "U" shape cross-sectional profile that receives the tire of the wheel 150 therein. The wheel receiver 136 can include a wheel fastener 142, such as a strap, cinch strap, ratchet strap, or the like, of plastic, fabric, or metal, that is received through the rim of the wheel 150 so as to fasten the wheel 150 into the trough 140 so that the wheel 150 is tightly coupled with the wheel receiver 136. The wheel receiver 136 can also include a frame mount 144 that can swivel at an axis 148 and may be extendable and may have a frame fastener 146 that fastens to a bicycle frame. The frame mounts 144 are well known in the art and often include an extendable arm and clamp as a frame fastener 146 to fasten to a frame of the bicycle so that the bicycle is further coupled to the wheel receiver 136. While the elongate member 138 can be long enough to receive front and back wheels 150 and include wheel fasteners 142 for both the front and back wheels 150, the elongate member 138 of the present embodiment may be shortened so as to only be long enough to receive the front wheel 150. These sizes are for a regular adult bicycle, such as a medium-sized road bike, and dimensions can be modified for different types of bikes, from mountain bikes to cyclocross bikes to cruisers to kid bikes. The frame mount 144 may be omitted or used to mount to the frame of the bicycle close to the front wheel 150. Optionally, the elongate member 138 is long enough for the trough 140 to receive both front and rear wheels 150 of a bicycle with a wheel fastener for each wheel 150 of the bicycle.

The embodiments of the bicycle rack 100 shown in FIGS. 1A-1E include curved extension members 104. However, the bicycle rack 100 can have other configurations. In one example shown in FIG. 1F, the bicycle rack 100 can include a substantially straight crossbar 102 having the one or more mounting members 114 (e.g., three mounting members 114 are shown) and the mounting brackets 106 being on ends of the straight crossbar 102, which excludes additional extension members 104. Also, the straight crossbar 102 may be curved, arced, or otherwise shaped, if desired, and exclude extension members 104 such that the mounting brackets 106 are on the ends of the crossbar 102.

In an additional example shown in FIG. 1G, the crossbar 102 can be connected to straight extension members 105 that extend laterally from the longitudinal axis of the crossbar 102. The straight extension members 105 can be coupled directly to the crossbar 102 as described in connection with the curved extension members 104. Alternatively, an elbow coupling 107 can be used to couple the crossbar 102 to the straight extension members 105. The straight extension members 105 have the mounting brackets 106 on the ends. Also, the straight extension members 105 can be telescoping so as to have the length adjustable in the lateral direction from the longitudinal axis of the crossbar 102.

Figure 2A:
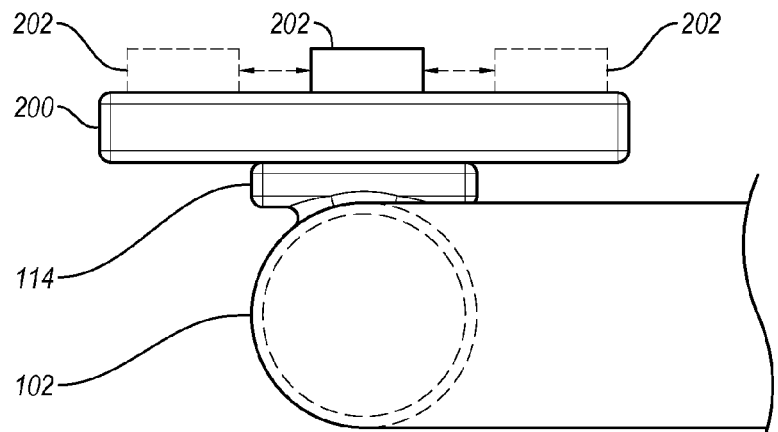
FIGS. 2A-2C show an embodiment of a bicycle rack that has a slidable adjustment mechanism.
Figure 2B:
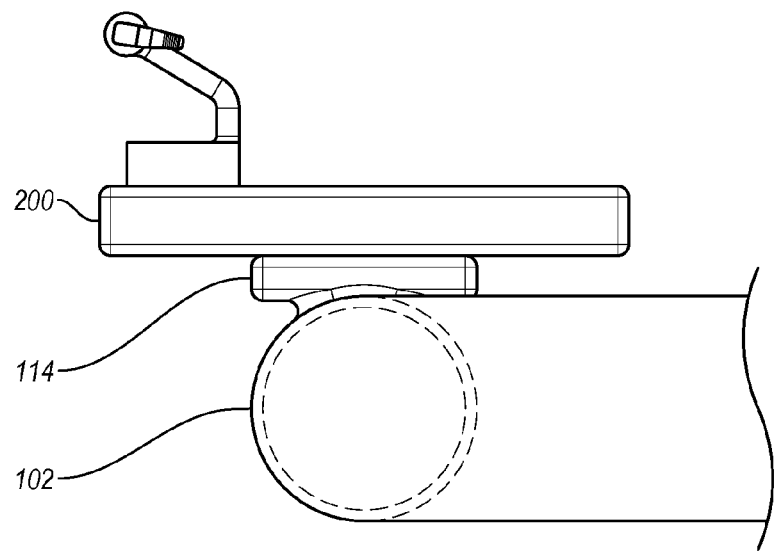
Figure 2C:
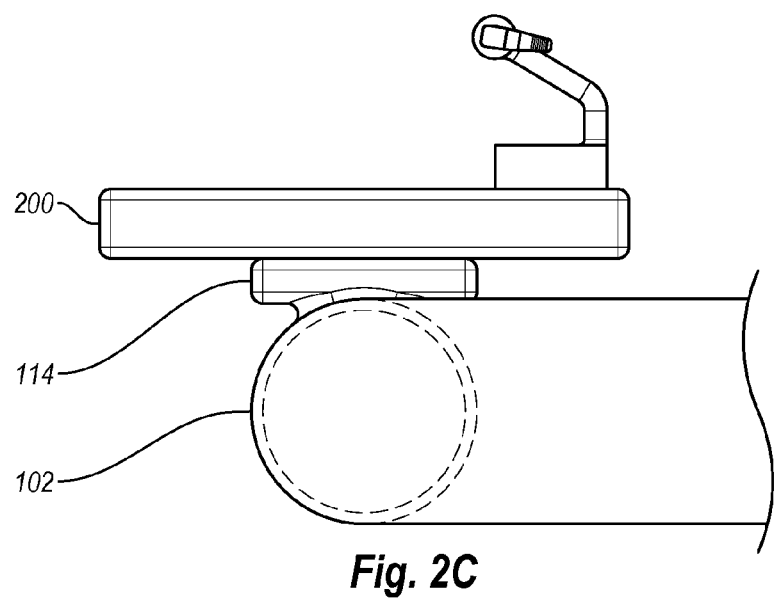

FIGS. 2A-2C illustrate an embodiment of a slider mount 200 that is mounted to a mounting member 114 that is mounted on the crossbar 102. The slider mount 200 is configured such that a slider bike receiver 202 can be slidably coupled with the slider mount 200. The slider mount 200 and the slider bike receiver 202 can slide with respect to each other and fixed at a desired location. The slider mount 200 and/or slider bike receiver 202 can include a fastener (not shown, such as a quick-release fastener) that locks the slider bike receiver 202 in a position relative to the slider mount 200, which fastener can be unlocked so that the slider bike receiver 202 can slide relative to the slider mount 200. The sliding direction is substantially laterally or orthogonally with respect to the longitudinal axis of the crossbar 102. The arrows show the sliding direction of the slider bike receiver 202 being perpendicular with the crossbar 102 so that the slider bike receiver 202 can be at a front end or middle portion or back end of the slider mount 200. However, the mounting member 114 may be configured as a slider mount 200 or they can be integrated or otherwise coupled together. In any event, the slider mount 200 and slider bike receiver 202 can cooperate to allow for the position of the bike mounted to the crossbar 102 to change and be adapted to different size bikes so that the rear wheel of the bike is received on the vehicle, vehicle accessory, or secondary wheel mount. The slider bike receiver 202 can be configured as a fork receiver 120 or wheel receiver 136. Alternatively, the slider bike receiver 202 can be fixed or coupled with a fork receiver 120 or wheel receiver 136. That is, the slider bike receiver 202 can be the bike receiver or can be attached to a bike receiver so that the bike receiver can slide along the slider mount and slide with respect to the crossbar 102. FIG. 2B shows a fork receiver 120 as the slider bike receiver 202 located on a first end of the slider mount 200. FIG. 2C shows the fork receiver 200 as the slider bike receiver 202 located on an opposite second end of the slider mount 200. Accordingly, the slidability allows for longer and shorter bikes (wheel to wheel) to be used with the bicycle rack 100 of the present invention.

Figure 3A:
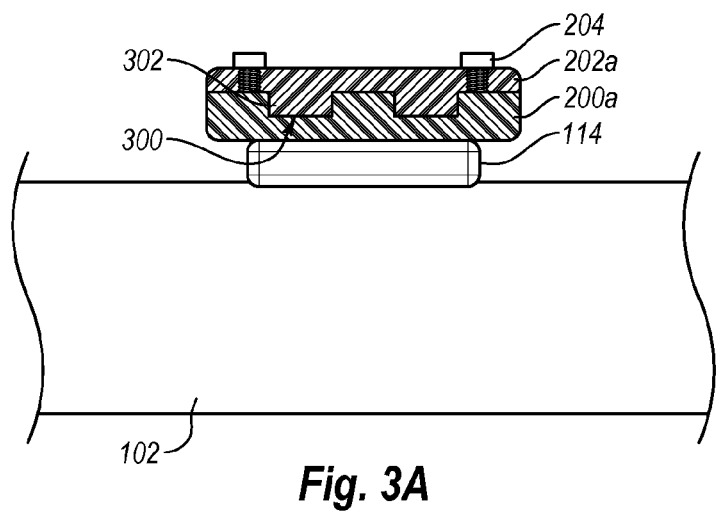
FIGS. 3A-3C show embodiments of bicycle racks that have a slidable adjustment mechanism.
Figure 3B:
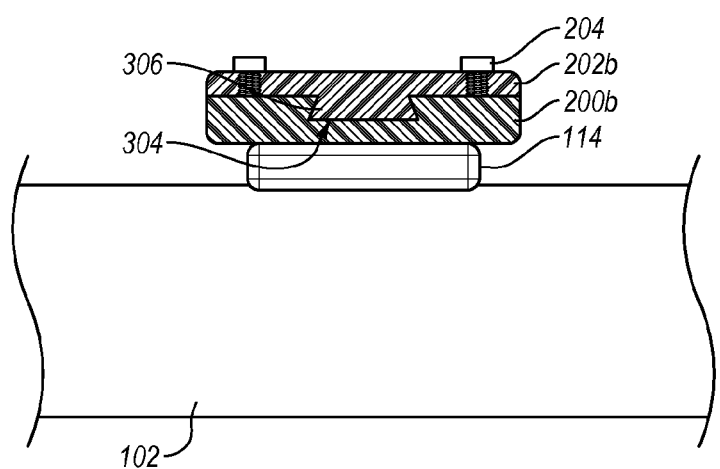
Figure 3C:
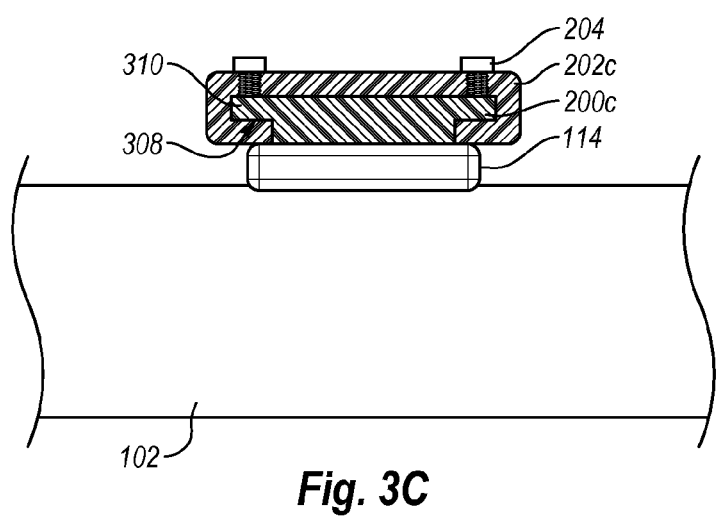

FIGS. 3A-3C show different embodiments of the slider mount 200 slidably engaged with the slider bike receiver 202. In each embodiment, a fastener 204 is shown to fasten the slider bike receiver 202 to the slider mount 200 to lock the relative positions. The fastener 204 can be any type of fastener that can be released to slide these components and then fastened to fasten the slider mount 200 and slider bike receiver 202 into a fixed position. FIG. 3A shows a grooved configuration where the slider mount 200a and slider bike receiver 202a have cooperative grooves 300 and rails 302 that mate with each other and where the grooves 300 provide tracks for the rails 302. Any number and orientation of the grooves 300 and rails 302 on the slider mount 200a and/or slider bike receiver 202a can be used as long as the sliding function is achieved. FIG. 3B shows a sloped groove 304 to have overhangs that interlock with the sloped rail 306. The sloped groove 304 and sloped rail 306 inhibit the slider bike receiver 202b to be withdrawn upwardly from the slider mount 200b, but which allow the ends of the slider mount 200b and slider bike receiver 202b to be received so that the sloped groove 304 receives the sloped rail 306, and which allows relative slidability thereof. FIG. 3C shows the slider mount 200c having or being configured as a "T"-shaped rail 308 that is received into a "T"-shaped recess 310 on the slider bike receiver 202c. However, the grooves and rails may be modified with the principles described herein. Also, the grooves and/or rails can be as shown or on the other member, and both may have grooves and rails or the slider mount 200 can include grooves to receive the rails of the slider bike receiver 202, or vice versa, or any slidable combination thereof.

Figure 4:
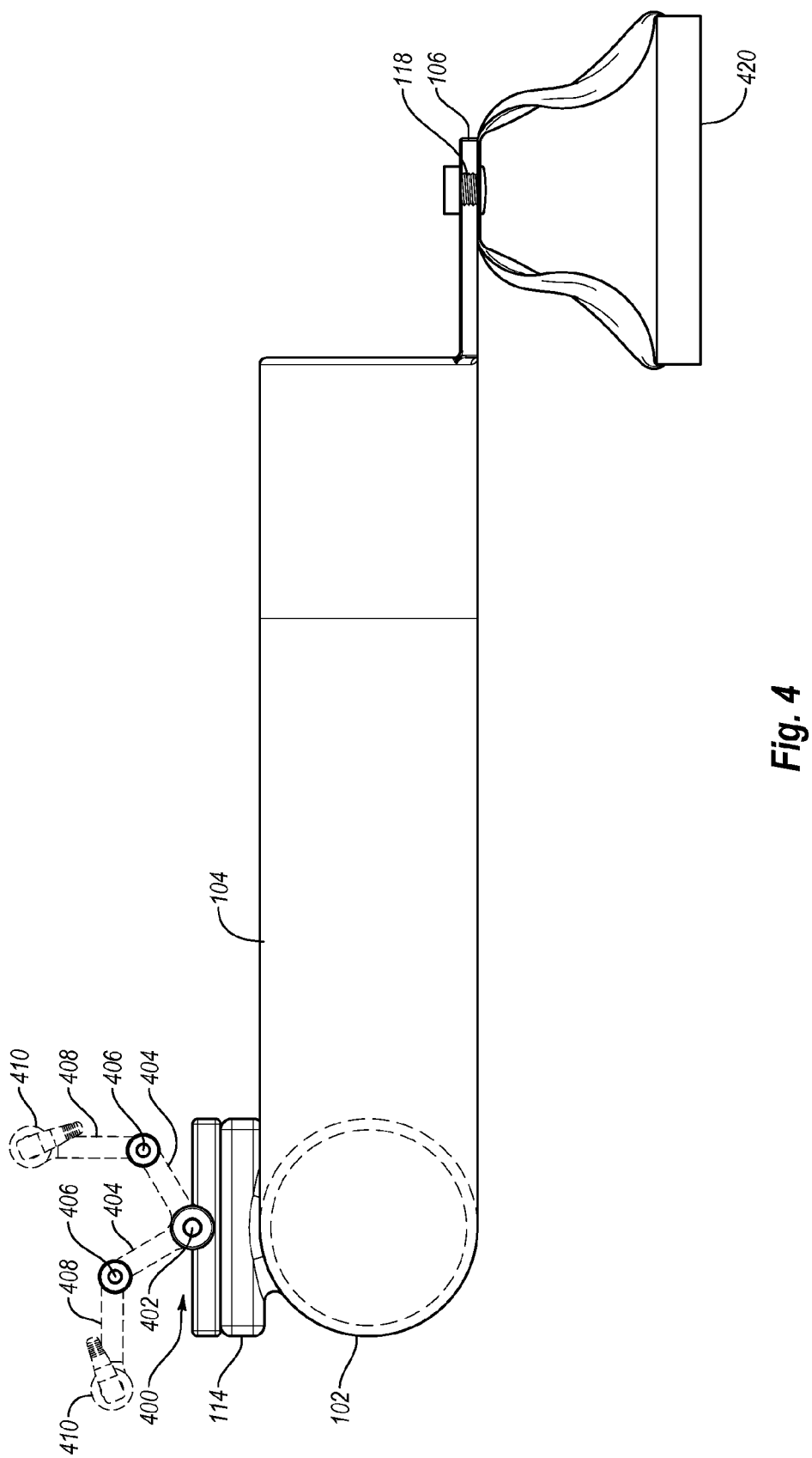
FIG. 4 shows an embodiment of a bicycle rack having an articulatable fork receiver and an optional handle.

FIG. 4 shows the crossbar 102 having the mounting member 114 coupled to an articulating fork receiver 400. The articulating fork receiver 400 can articulate so as to allow for adjustability in the position of the bike fork with respect to the crossbar 102. Two positions of the same articulating fork receiver 400 are shown by the dashed lines, where the articulating fork receiver 400 can be in either orientation as shown or other orientation possible by the articulation. For example, the articulating fork receiver 400 can include a main pivot point 402 that allows the body 404 to articulate or rotate relative to the mounting member 114. Also, the articulating fork receiver 400 can include a secondary pivot point 406 that allows the support section 408 to articulate or rotate relative to the body 404. The support section 408 includes the fork mount 410 that mounts to the bicycle fork, where embodiments of such a mount 410 is well known in the art.

Also, FIG. 4 shows that a handle 420 can be included with the present invention. That is, the handle 420 can be coupled to or integrated with any component of the bicycle rack embodiments described herein. As shown, the handle 420 is coupled to the mounting bracket 106, such as by being received through the aperture 118. However, the handle 420 can be mounted, integrated, or coupled with the crossbar 102 or extension member 104 or other mounting. In one option, the handle 420 can be mounted to the roll cage or roof rack or other vehicle accessory. The handle 420 can be useful for facilitating installation of the bicycle rack to the roll cage or roof rack or other vehicle accessory, or installation of a bicycle to the bicycle rack. While one embodiment of a handle 420 is shown, any handle in any configuration can be included in a system or kit having the bicycle rack.

Figure 5A:
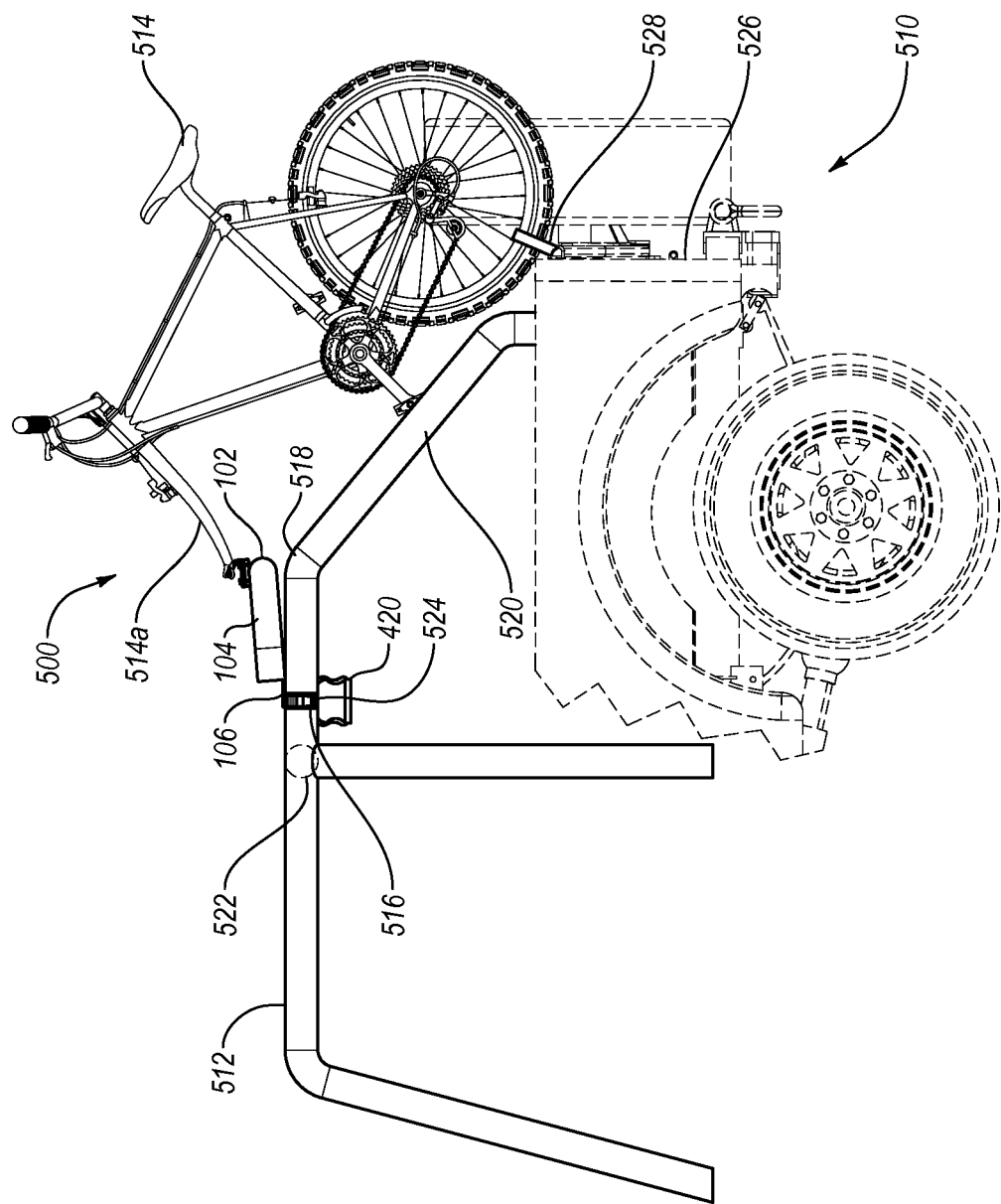
FIGS. 5A-5C show embodiments of bicycle rack systems adapted to be coupled to an exposed roll cage of a vehicle.
Figure 5B:
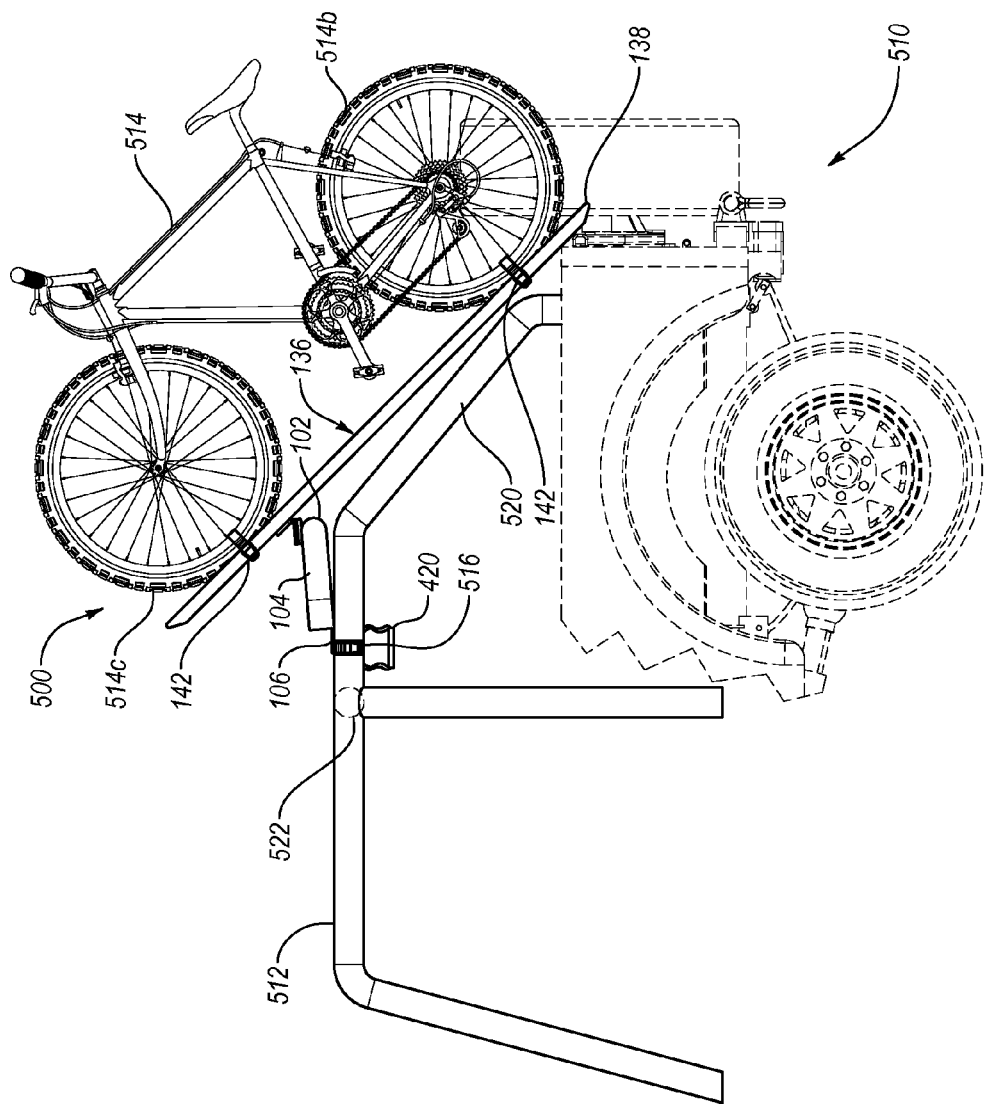
Figure 5C:
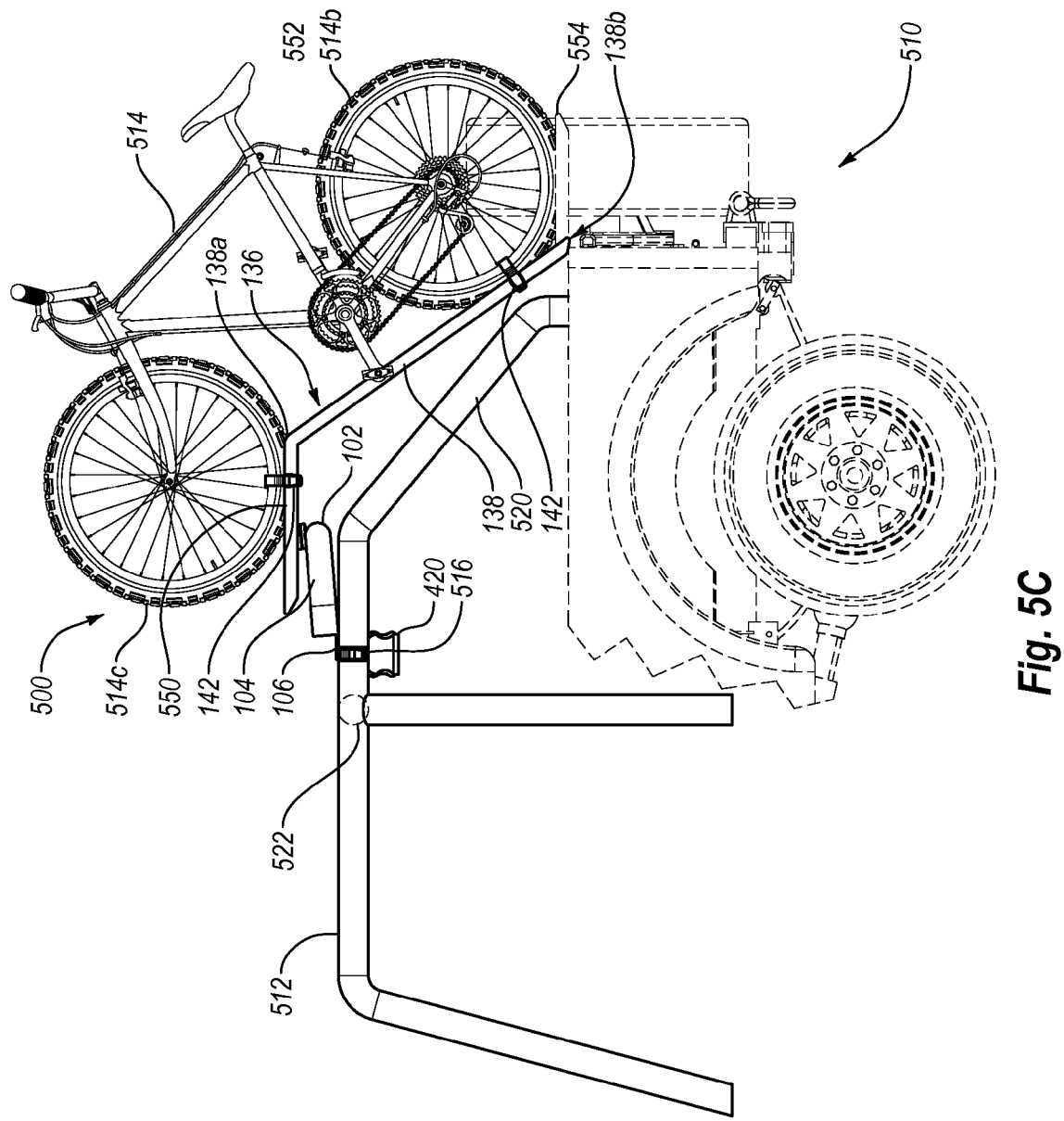

FIGS. 5A-5C illustrate different embodiments of rack systems 500 that can be mounted to a roll cage 512 of a vehicle (e.g., stock roll cage of a Jeep Wrangler®). The rack systems 500 can include any embodiment of the bicycle rack 100 and features thereof from FIGS. 1A-1G.

FIG. 5A shows a vehicle 510 (e.g., Jeep® with top off) with a roll cage 512 that has the rack system 500 coupled thereto. That is, the rack system 500 is coupled to the roll cage 512 in order to be coupled to the vehicle. As shown, the rack system 500 is mounted on top of the roll cage 512 so that the bike 514 sits over a portion of the roll cage 512. The rack includes the crossbar 102 and extension members 104 that extend between the mounting bracket 106 and the crossbar 102. The mounting bracket 106 is shown to have the aperture 118. The roll cage 512 can include a factory pre-drilled hole 516 on both top side bars 518, which is common on the roll cages 512 of Jeep Wranglers®. That is, the roll cage 512 includes a pre-drilled hole 516 on each top side bar 518 between the down bar 520 and middle bar 522, which pre-drilled hole 516 is provided for vehicle accessories to be mounted thereto. The pre-drilled hole 516 is often between holes for the speaker system (not shown) and the down bar 520. Providing a Jeep® with a roll cage 512 with a pre-drilled hole 516 can be beneficial in an embodiment of the invention. As such, a fastener 524 is inserted through the aperture 118 in the mounting bracket 106 and through the pre-drilled hole 516 so as to fasten the rack system 500 to the roll cage 512. However, a hole can be drilled if the roll cage 512 does not include the pre-drilled hole 516. The fastener 520 can be dimensioned to be received through both the aperture 118 and pre-drilled hole 516. Once the rack system 500 is mounted to the roll cage 512, the bike 514 can be mounted to the rack system 500 as bikes are commonly mounted to bike carriers. As shown, the front fork 514a is coupled to the rack system 500 that includes a fork receiver 120 (see FIG. 1D) so that the bike 514 is over the roll cage 512. Also, the rear wheel 514b of the bike 514 is set on the tailgate 526 of the vehicle 510. Jeep Wranglers® commonly have a tailgate 526. As such, the rack system 500 is mounted on the roll cage 512 so that the bike 514 has its front fork 514a on the crossbar 102 of the rack system 500 with the rear wheel 514b on the tailgate 526 of the vehicle 510. In one aspect, the rear wheel 514b can just rest on the tailgate 526 without being coupled, attached, or mounted thereto. In another aspect, the rear wheel 514b can be coupled to the tailgate 526 or to some other feature of the vehicle or tailgate 526 (e.g., handle or spare tire) via a strap 528. Here, the strap 528 is received through an aperture (not shown) associated with the tailgate 526 (which aperture can be from the handle that opens and closes the tailgate 526). The strap 528 may also be long enough to be wrapped around the down bar 520 and the rear wheel 514b to secure the bike 514 to the roll cage 512. Additionally, a handle 420 should to be mounted to the roll cage 512.

FIG. 5B is similar to FIG. 5A; however, instead of a fork receiver 120, the rack system 500 includes a wheel receiver 136, such as in FIG. 1E. The wheel receiver 136 includes an elongate member 138 that is dimensioned sufficiently to receive the front wheel 514c and rear wheel 514b. Wheel fasteners 142 (e.g., straps) are used to mount the bike 514 on the elongate member 138. Here, the elongate member 138 is straight, which is common for elongate members 138 of bike racks that receive both wheels (514b, 514c) of a bike 514.

FIG. 5C is similar to FIG. 5A; however, the elongate member 138 includes at least one bend 138a so that a first section 550 and second section 552 are at different angles with respect to the bend 138a as shown. The elongate member 138 can terminate or have a second bend 138b. When only a first bend 138a is included, the rear wheel 514b can rest on an end of the elongate member 138 or on the tailgate 526 as described in FIG. 5A. When a second bend 138b is included, a third section 554 can be included on the elongate member 138, which can receive the rear wheel 514b. The elongate member 138 may or may not be mounted to the tailgate 526 or spare tire, or other location, and the third section 554 may rest on the tailgate 526 or be mounted thereto.

Figure 6A:
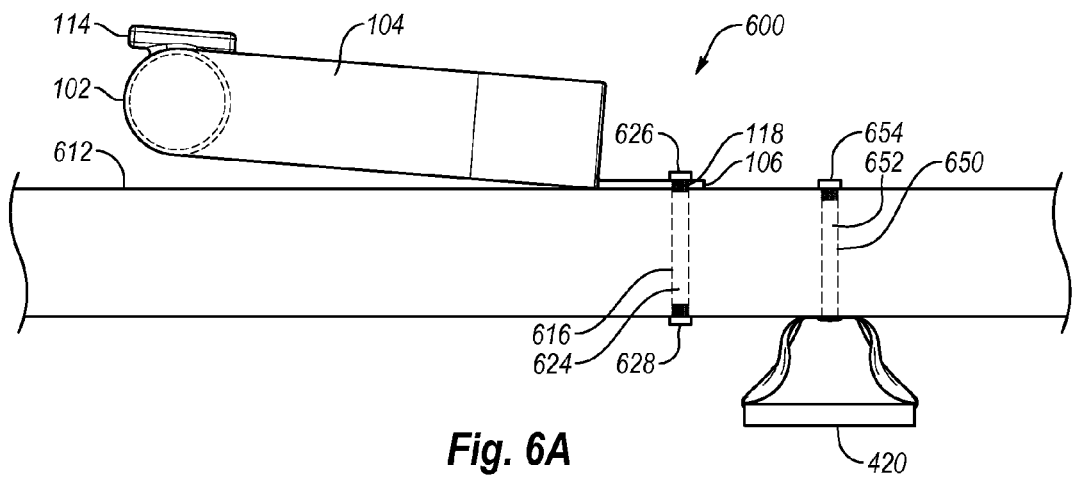
FIGS. 6A-6C show embodiments of mounting systems that mount a bicycle rack to an exposed roll cage of a vehicle.
Figure 6B:
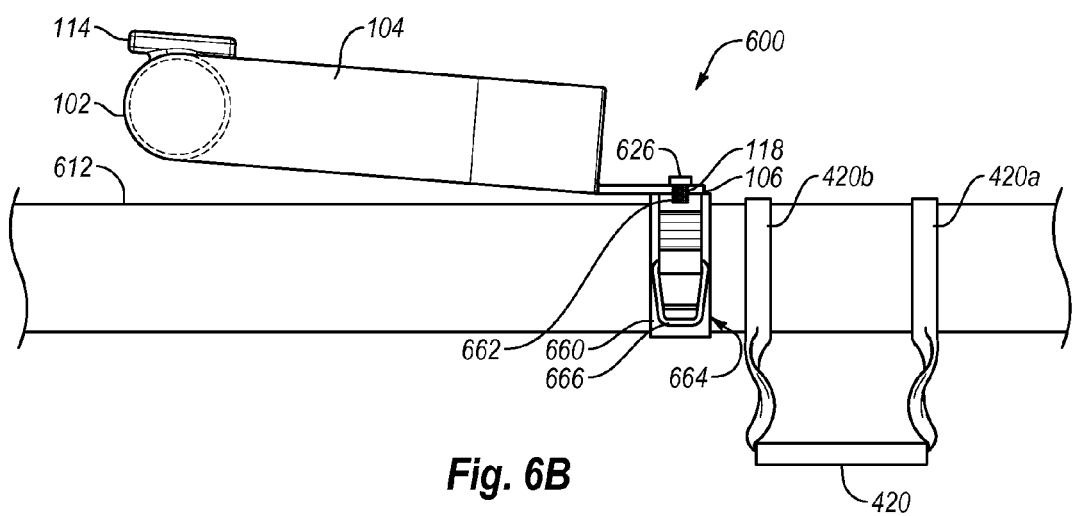
Figure 6C:
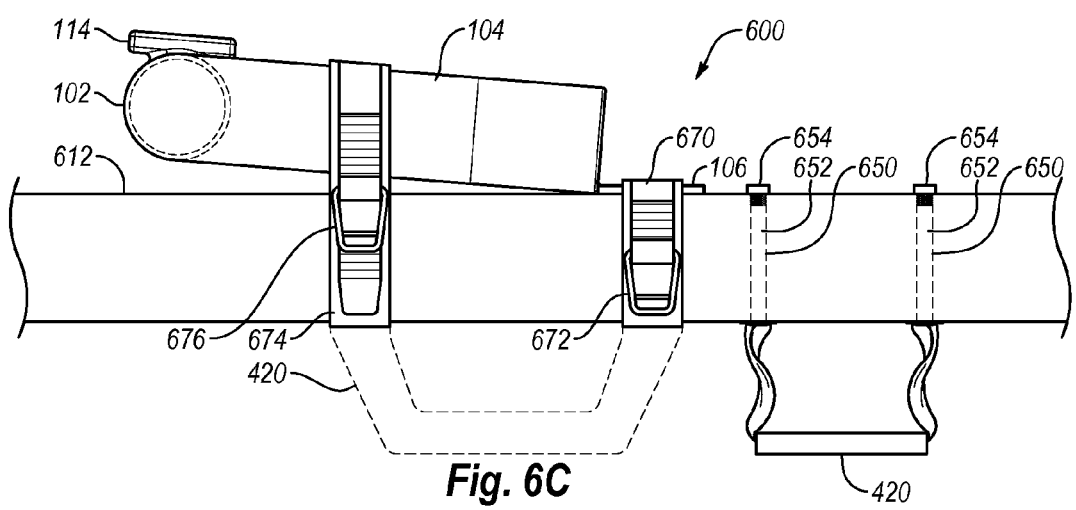

FIGS. 6A-6C show a rack system 600 being mounted to a roll cage 612. The rack system 600 can include the features of any embodiment described herein.

FIG. 6A shows a rack system 600 having the crossbar 102 coupled to the extension members 104, which are coupled to the mounting brackets 106. As shown, the roll cage 612 includes a pre-drilled hole 616 that extends from one side to the other side of the roll cage 612. The pre-drilled hole 616 can be a factory pre-drilled hole or can be pre-drilled prior to installation of the rack system 600. The mounting bracket 106 includes an aperture 118 that is compatible with the pre-drilled hole 616 such that a fastener 624 received through the aperture 118 also can pass through the pre-drilled hole 616. While the aperture 118 and pre-drilled hole 616 can be of the same dimension, they may be different dimensions when the fastener 624 has a portion dimensioned for the aperture 118 and a portion dimensioned for the pre-drilled hole 616. The fastener 624 is shown to include a top stop member 626 that inhibits the fastener 624 from passing down through the aperture 118 and/or pre-drilled hole 616 and a bottom stop member 628 that inhibits the fastener 624 from passing up through the aperture 118 and/or pre-drilled hole 616. One of the top stop member 626 and/or bottom stop member 628 may be integrated with the shaft of the fastener 624 so as to be a bolt with the other being a nut. Any similar fastener configuration that fastens the mounting bracket 106 to the roll cage 612 can be used. For example, the fastener 624 can be a quick-release fastener, where quick-release fasteners are common on bicycles and bike racks. Also, the roll cage 612 is shown to include a handle 420 coupled thereto, where the handle 420 is shown to have a shaft 625 inserted through a hole 650 (e.g., another pre-drilled hole or other hole) with a top stop member 654 coupled to the shaft 625 to fasten the handle 420 to the roll cage 612. The shaft 625 and top stop member 654 can be integrated as a bolt. Other fasteners can be used that fit through a hole 650 in a roll cage 612 to mount the handle 420 to the roll cage 612.

FIG. 6B is similar to FIG. 6A; however, the rack system 600 is mounted differently to the roll cage 612. As shown, the rack system 600 includes a clamp 660 that is received around the roll cage 612 (e.g., bar of roll cage) in order to mount the rack system 600 to the roll cage 612. The mounting bracket 106 includes the aperture 118 that receives a shaft 662 that is associated or integrated or otherwise coupled with the clamp 660, and a top stop member 626 is coupled or integrated with the shaft 662. Various couplings between the mounting bracket 106 and clamp 660 are possible. Also, the clamp 660 includes an adjustment mechanism, such as a cinch member, that allows the diameter of the clamp 660 to be increased to loosen the rack system 600 from the roll cage 612 or decreased to tighten the rack system 600 to the roll cage 612. The clamp 660 can be plastic, fabric, metal, or other material that can be used as a clamp 660, and may be cinch straps or have some ratcheting mechanism for tightening. Also, the handle 420 is shown to have straps 420a, 420b wrapped around the roll cage 612 to mount the handle 420 to the roll cage. The straps 420a, 420b can be adjustable, and may be Velcro or any other type of strapping.

FIG. 6C is similar to FIGS. 6A and 6B; however, the rack system 600 includes one or more straps 670, 674 to that can strap the rack system 600 to the roll cage 612. The straps 670, 674 can be any type of strapping member, such as Velcro, elastic, cinch, or other. As shown, a first strap 670 is strapped around the mounting bracket 106 and around the roll cage 612 so as to fasten the rack system 600 to the roll cage 612. A second strap 674 is strapped around the extension member 104 and around the roll cage 612 so as to fasten the rack system 600 to the roll cage 612. The first strap 670 can be integrated or coupled or removable or strap-bound with the mounting bracket 106, and the second strap 674 can be integrated or coupled or removable or strap-bound with the extension member 104. The first strap 670 is shown to have a cinch member 672, which can cinch or ratchet so that the first strap 670 can be tightened or loosened. The second strap 674 is shown to have a cinch member 676, which can cinch or ratchet so that the second strap 674 can be tightened or loosened. The dashed lines show an optional handle 420 that can be coupled or part of the straps 670, 674. Also, a handle 420 can be mounted to the roll cage 612 by having one or more shafts 662 fit within the same number of holes 650 in the roll cage 612, where a top stop member 654 is received onto or coupled or integrated or otherwise fastened to each shaft 662.

Figure 7A:
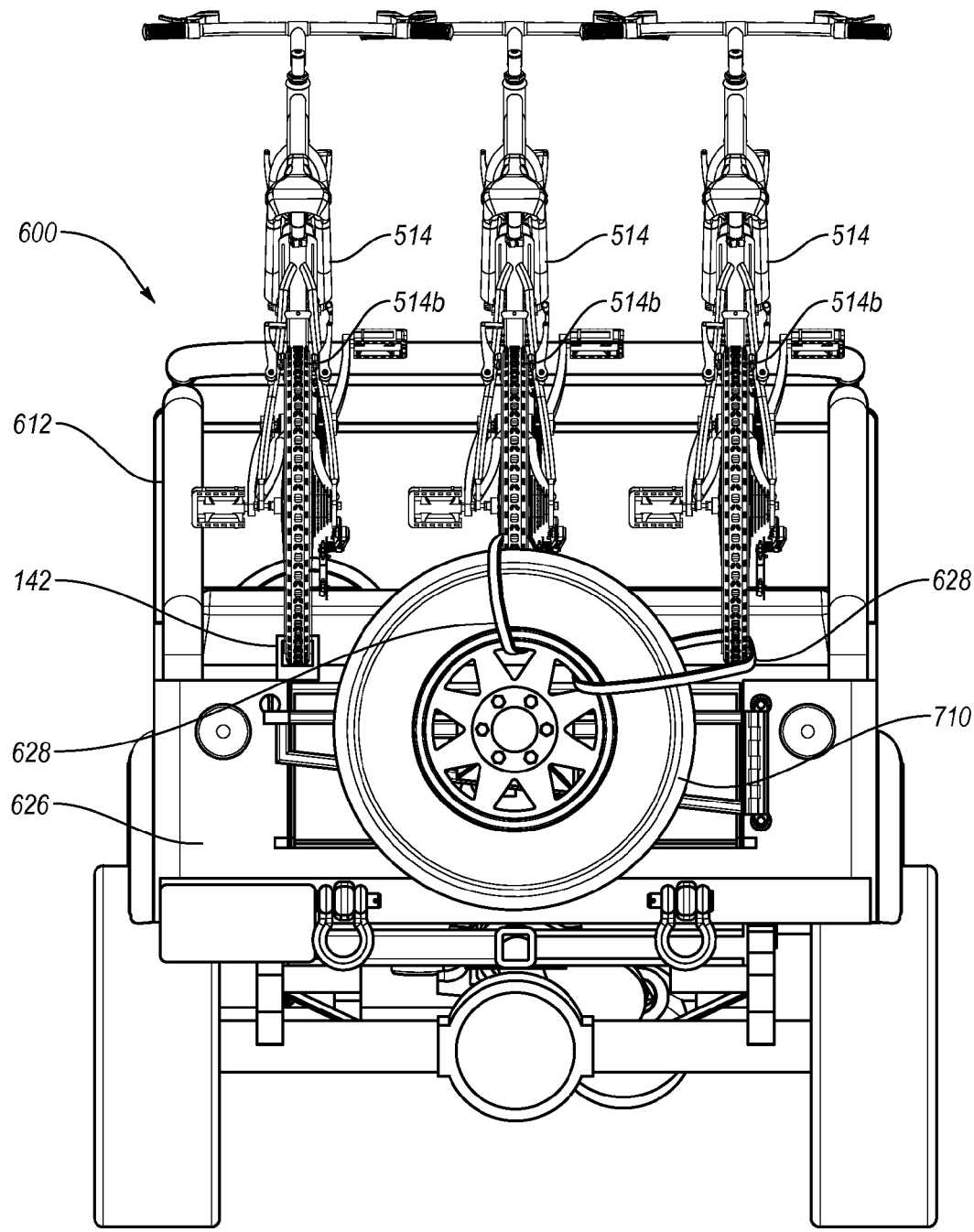
FIGS. 7A-7C show embodiments of wheel mounting systems that mount a bicycle wheel to a back of a vehicle having an exposed roll cage.
Figure 7B:
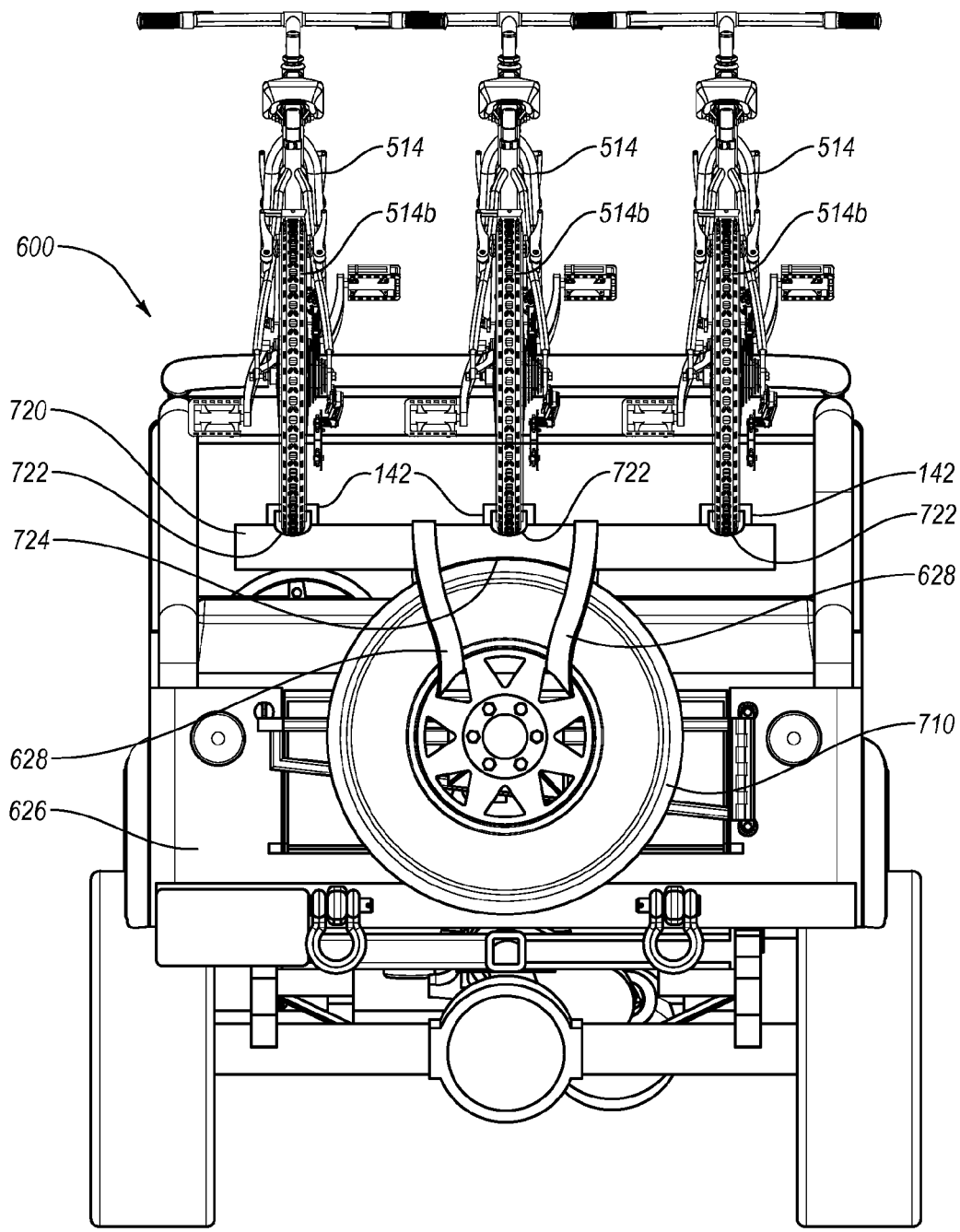
Figure 7C:
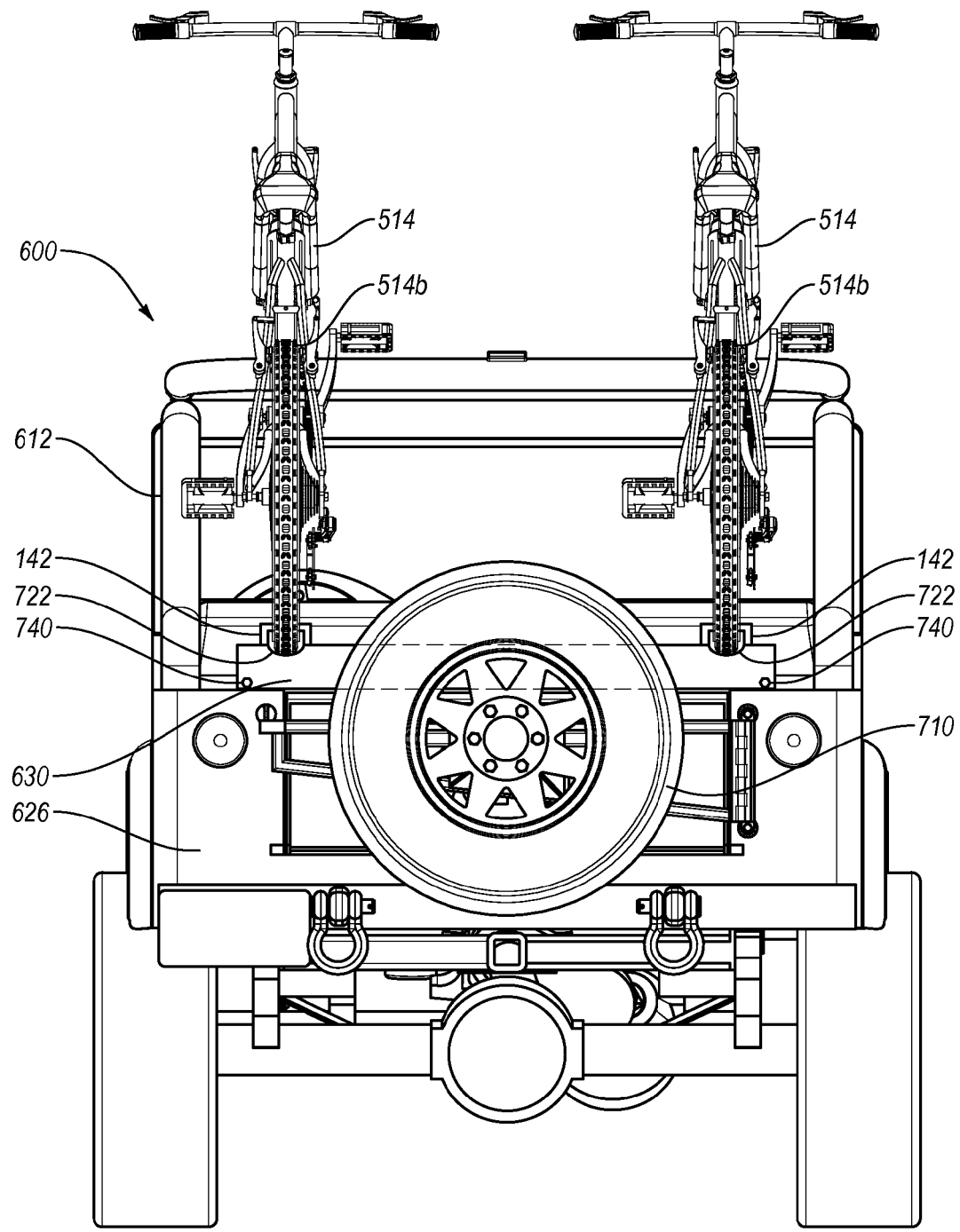

FIGS. 7A-7C show a rack system 600 being mounted to a roll cage 612 so that a bike 514 has the rear wheel 514b supported by a back part of the vehicle, such as a Jeep Wrangler®. The rack system 600 can include the features of any embodiment described herein.

FIG. 7A shows a rack system 600 that can have different ways of receiving the rear wheel 514b. That is, the rack system 600 of the present invention can have the rear wheel 514b received by a variety of ways with or without special wheel receiving devices. In one example shown on the right, the rear wheel 514b of a bike 514 can merely rest on the tailgate 626 of a vehicle, such as a sport utility vehicle with its top removed with or without a soft top, such as a Jeep Wrangler®. The rear wheel 514b may rest on the tailgate 626 with or without the illustrated strap 628, which can be any type of strap of any material. When used, the strap 628 can wrap around anything on the vehicle including the spare tire (e.g., threaded through rim), bumper, handle, roll cage, or other. The center example, the rear wheel 514b can rest on a rear-mounted spare tire 710 with or without a strap securing the rear wheel 514b thereto. The left example shows a rear wheel receiver 720 mounted to the tailgate 626, where the rear wheel receiver 720 receives the rear wheel 514b of the bike 514. The rear wheel receiver 720 can be coupled to the tailgate 626 in any manner. The rear wheel receiver 720 can be adapted to receive a single rear wheel 514b of a single bike 514, and can have a "U"-shaped trough. The rear wheel receiver 720 can include a wheel fastener 142 (e.g., cinch or ratchet strap or other) that is received around the rim of the rear wheel 514b to secure it to the rear wheel receiver 720.

FIG. 7B shows an embodiment of a rear wheel receiver 720 (e.g., rear wheel receiver bar) that can be received onto the rear part of a sport utility vehicle. The rear wheel bar 720 can include one or more "U"-shaped troughs 722 dimensioned to receive a rear wheel 514b of bike 514, where three troughs 722 are shown, and two troughs 722 may be preferred. Each trough can include a wheel fastener 142 as shown and described herein. The rear wheel bar 720 may have a flat bottom, but may also have a curved or arced bottom 724 that is shaped to be received onto a rear-mounted spare tire 710 as shown. When mounted on a rear-mounted spare tire 710, the rear wheel bar 720 can include straps 628 that are wrapped around the spare tire 710 so as to secure the rear wheel bar 720 thereto so that it does not move or is held substantially in place. The straps 628 can be wrapped around the rear wheel bar 720 or be coupled or integrated therewith, such as with the handles or other racks described herein (see FIGS. 6A-6B).

FIG. 7C shows another embodiment of a rear wheel bar 630 that is dimensioned to fit on a tailgate 626 of a sport utility vehicle, such as a Jeep Wrangler® when the hard top is off, and with or without a soft top on. The top of the rear wheel bar 630 can include one or more "U"-shaped troughs 722 dimensioned to receive a rear wheel 514b of a bike 514, where two troughs 722 are shown. Each trough can include a wheel fastener 142 as shown and described herein. The rear wheel bar 630 may have a flat bottom, but may also have a "U"-shaped trough (not shown) that runs the length of the rear wheel bar 630 and dimensioned to fit over the tailgate 626 such that the tailgate 626 is received into the "U"-shaped trough. One or more fasteners 740 may be included to fasten the rear wheel bar 630 to the tailgate 626.

Figure 8:
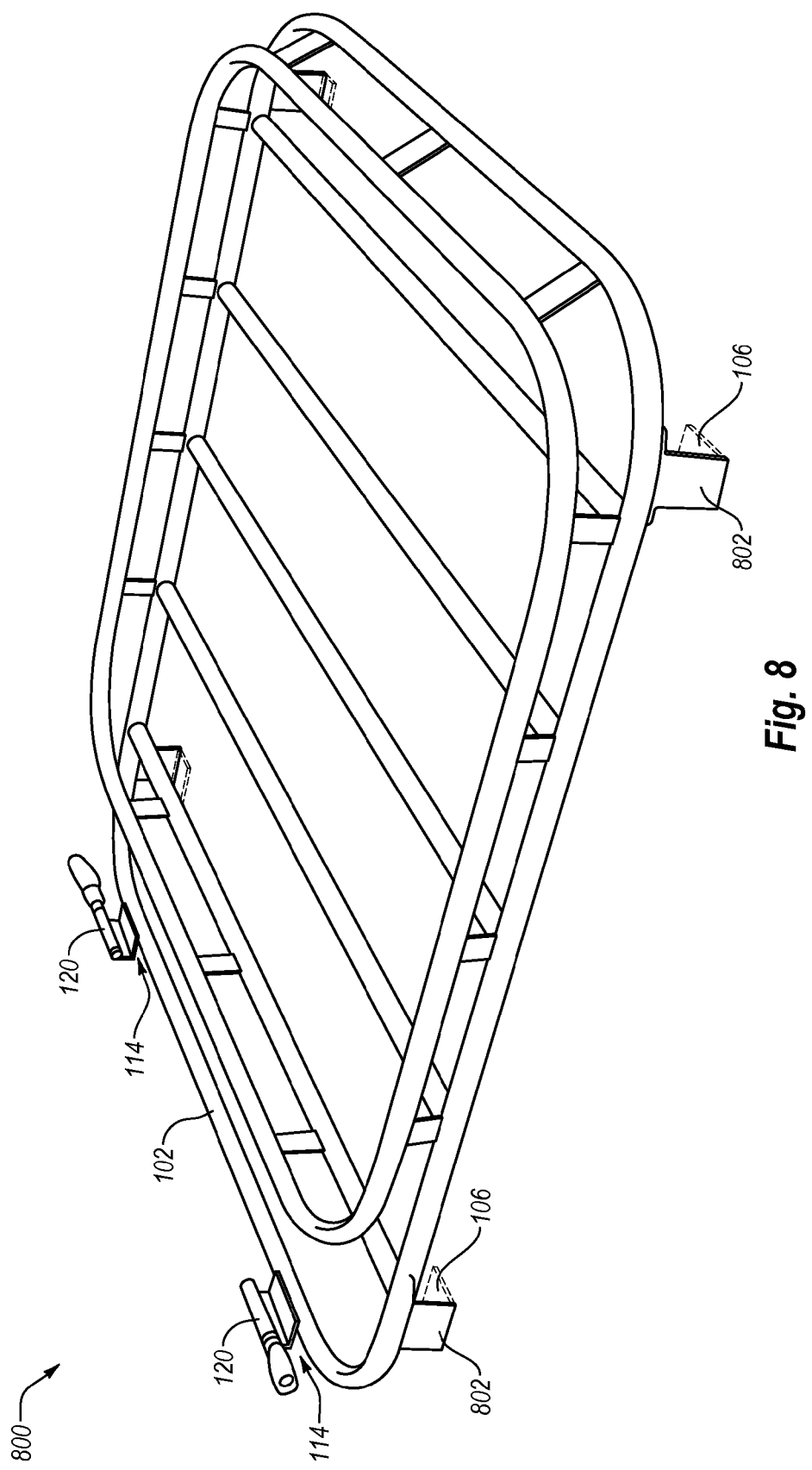
FIG. 8 shows an embodiment of a safari rack configured as a bicycle rack.

In one embodiment, the bicycle rack can be configured as a safari rack. As such, a safari rack can include one or more bike receivers, which can be fork receivers and/or wheel receivers. FIG. 8 illustrates an embodiment of a safari bike rack 800. The safari bike rack 800 includes a safari rack 802 having a crossbar 102 with two mounting members 114. The mounting members 114 are shown to include fork receivers 120; however, wheel receivers may also be included. The safari bike rack 800 is shown to include a drop bracket 802 extending from the rack for use in mounting to a roll cage as described herein. The drop bracket 802 can include a mounting bracket 106 to facilitate mounting to a roll cage as described herein. Also, the safari bike rack 800, crossbar 102, and the like can be configured so that when a bike is received into the fork receivers 120, the rear wheel of the bike can rest on the tailgate of the SUV that has the roll cage exposed (e.g., Jeep Wrangler®). The safari bike rack 800 can have the safari rack portion with other known or developed configurations. One of ordinary skill in the art will recognize that the arrangement of the bike receivers on the safari rack can be on any of the crossbars, and the safari rack itself may be any embodiment of a safari rack known or later developed. In fact, an additional rear wheel receiver may be mounted to another crossbar of the safari rack. Also, the bike receiver can be any type of bike receiver, including those described herein. In one aspect, the arrangement can allow for the bike to be received into the bike receiver on the crossbar of the safari rack so that the rear wheel rests on the tailgate of a SUV lacking a rear shell/top that has a roll cage as the safari rack is configured to mount to a roll cage as described herein. Mounting brackets 106 are shown in dashed lines as they may be optional as other mounting configurations and mounting components known to safari racks may be used to mount the safari rack to the roll cage. Also, any embodiment of the configurations of the crossbar and bike receiving components can be combined or used with the safari bike rack embodiment.

In one embodiment, a bicycle rack comprises: a crossbar having an elongate longitudinal length section with laterally curved end sections extending from each side of the longitudinal length, the crossbar having a top side that includes one or more bicycle receivers and having a length sufficient to extend across a roll cage of a vehicle; and a mounting bracket on an end of each laterally curved end section, the mounting brackets each being planar with an aperture extending through the bracket from a top surface to an opposite bottom surface, the mounting brackets each having bottom surface adapted to be received on a surface of a longitudinal bar of the roll cage with a fastener extending through each aperture and a vertical hole in the longitudinal bars such that the crossbar is elevated off the longitudinal bars or a plane extending between the surfaces of the longitudinal bars. In one aspect, the crossbar is elevated sufficiently such that the roll cage can include a soft top or bikini top without interference with the crossbar. In one aspect, the bicycle receivers are front fork receivers. In one aspect, the bicycle rack has the fastener extending through the aligned aperture of the mounting bracket and the hole of the longitudinal bars of the crossbar. The mounting bracket can be mounted so its bottom surface aligns with or is continuous with the bottom surface of the crossbar (e.g., with the laterally curved end sections.

In one embodiment, the elongate longitudinal length section can have a length between curved end sections of about 20 inches to about 80 inches, from about 30 inches to about 70 inches, from about 40 inches to about 60 inches, or about 51 inches, or about any integer therebetween. The elongate longitudinal length section can have a diameter of about 0.5, 1, 2, 3, or 4 inches. The elongate longitudinal length section can have a rounded or flat top with a width of about 0.5, 1, 2, 3, or 4 inches. The laterally curved end sections can have a length from the elongate longitudinal length to the mounting bracket of about 2 inches to about 20 inches, from about 3 inches to about 16 inches, from about 4 inches to about 16 inches, from about 5 inches to about 12 inches from about 6 inches to about 10 inches, from about 8 inches to about 9 inches. The mounting bracket can have a first dimension of about 0.5 inches to about 5 inches, from about 1 inch to about 2.5 inches, from about 1.25 inches to about 2 inches, or about 1.25 inches to 1.75 inches; and a second dimension of 0.25 inches to about 4 inches, from about 0.5 inches to about 3 inches, from about 0.75 inches to about 2 inches, or about in inch; with a thickness of about 0.05 inches to about 2 inches, from about 0.1 inches to about 1 inch, from about 0.25 inches to about 0.75 inches, or about 0.5 inches. The aperture in the mounting bracket can have a diameter of about 0.01 inches to about 1 inch, from about 0.05 inches to about 0.75 inches, from about 0.1 inches to about 0.5 inches, or about 0.25 inches. The distance between the two apertures on the two mounting brackets is about 20 inches to about 80 inches, from about 30 inches to about 70 inches, from about 40 inches to about 60 inches, or about 51 inches, or about any integer therebetween. If a straight line is drawn from each aperture of the mounting brackets, the distance from that line to the center of the elongate longitudinal length section is about 2 inches to about 20 inches, from about 3 inches to about 16 inches, from about 4 inches to about 16 inches, from about 5 inches to about 12 inches from about 6 inches to about 10 inches, from about 8 inches to about 9 inches. The laterally curved end sections can form an angle of about 20, 30, 40, 45, 50, 60, 70, 80 or 90 degrees with the elongate longitudinal length section. The bottom surface of the mounting bracket can form an angle with the laterally curved end sections of about 10, 20, 30, 40, 45, 50, 60, 70, 80 or 90 degrees. The bicycle receivers can be mounted on the top surface of the crossbar at the center and/or at about 1, 5, 10, 20, 30, or 40 inches from the center and/or at about 1, 5, 10, 20, 30, or 40 inches from the beginning of the laterally curved end sections. The distance from the crossbar (e.g., center) to the tailgate when mounted on a roll cage of a Jeep Wrangler® is about 38, 39, 40, 41, 42, 43, 44, 45, 46, 47, 48, 49, 50, 51, 52, 53, 54, 55, 56, 57, 58, 59, or 60 inches for a when the bike is fork mounted and about 20, 21, 22, 23, 24, 25, 26, 27, 28, 29, 30, 31, 32, 33, 34, 45, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65 inches when the bike is wheel mounted. The distance from the predrilled holes in the roll cage or drilled holes in the roll cage to the to the tail gate is about 2 inches to about 20 inches, from about 3 inches to about 16 inches, from about 4 inches to about 16 inches, from about 5 inches to about 12 inches from about 6 inches to about 10 inches, from about 8 inches to about 9 inches more than the distance from the crossbar (e.g., center) to the tailgate when mounted on a roll cage of a Jeep Wrangler®.

In one embodiment, the present invention includes a vehicle comprising the bicycle rack and the roll cage. In one aspect, the bicycle rack is mounted on the roll cage, wherein the bicycle rack is positioned relative to the roll cage such that a bicycle mounted to bicycle receivers of the bicycle rack has its rear wheel resting on the tailgate or rear-mounted spare tire. In one aspect, the vehicle has the bicycle received into the bicycle receivers with the rear wheel of the bike resting on the tailgate. In one aspect, the vehicle includes a strap received through the rear wheel of the bicycle and secured to the vehicle. In one aspect, the strap is received through a rim of a spare tire mounted to the rear of the vehicle. For example, the vehicle can be a two-door or four-door Jeep Wrangler®, which can be referred to here as a SUV with an exposed roll cage and tailgate.

In one embodiment, the present invention is a roll cage having the bicycle rack mounted to the roll cage. In one aspect, the bicycle rack is positioned relative to the roll cage such that a bicycle mounted to bicycle receivers of the bicycle rack has its rear wheel extending past the roll cage when the roll cage is mounted in the vehicle. In one aspect, the bicycle is received into the bicycle receivers with the rear wheel of the bicycle extending past the roll cage.

In one embodiment, the present invention includes a method of mounting a bicycle rack to a roll cage, the method comprising: providing the bicycle rack and roll cage; mounting the mounting brackets of the bicycle rack to the roll cage such that the longitudinal length section of the crossbar is extended from the surface of the top longitudinal bars of the roll cage by the angle of the laterally curved end sections and bottom surface of the mounted brackets and so that the laterally curved end sections locate the crossbar toward the rear of the roll cage relative to the hole in the top longitudinal bar.

In one aspect, the mounting includes: inserting the fastener through each of the aligned apertures of the mounting brackets and vertical holes in the longitudinal bar; and fastening the mounting brackets to the top longitudinal bars of the roll cage. In one aspect, the roll cage is mounted in a vehicle having the roll cage exposed, the method comprising: positioning the crossbar so that a front fork of a bicycle received into the bicycle receivers positions a rear wheel of the bicycle onto a tailgate of the vehicle.

In one embodiment, the present invention includes a method for mounting a bicycle to a bicycle rack on an exposed roll cage of a vehicle, the method comprising: providing a vehicle having an exposed roll cage and tailgate external to the roll cage and having a bicycle rack coupled to the exposed roll cage, the bicycle rack comprising: a crossbar having an elongate longitudinal length section with laterally curved end sections extending from each side of the longitudinal length, the crossbar having a top side that includes one or more bicycle receivers and having a length sufficient to extend across the roll cage of the vehicle; a mounting bracket on an end of each laterally curved end section, the mounting brackets each being planar with an aperture extending through the bracket from a top surface to an opposite bottom surface, the mounting brackets each having bottom surface received on a surface of a longitudinal bar of the roll cage with a fastener extending through each aperture and a vertical hole in the longitudinal bars such that the crossbar is elevated off the longitudinal bars or a plane extending between the surfaces of the longitudinal bars; and mounting a bicycle to one of the bicycle receivers on the crossbar such that the rear wheel of the bicycle rests on the tailgate of the vehicle.

In one embodiment, the front fork of the bicycle is received into the bicycle receivers, wherein the bicycle receivers are configured to receive the front fork of the bicycle. The method can include coupling the rear wheel of the bicycle to a rear portion of the vehicle. In one aspect, the method can include gripping a handle mounted to the roll cage while lifting the bicycle onto the roll cage. In one aspect, the method can include coupling the bicycle rack to the roll cage such that when mounting the bicycle to one of the bicycle receivers on the crossbar, the rear wheel of the bicycle rests on the tailgate of the vehicle.

In one embodiment, the method can be performed by resting the rear wheel of the bicycle on the tailgate before and during mounting the bicycle to one of the bicycle receivers on the crossbar.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A safari bicycle rack comprising:
    a bottom safari bicycle rack bar defining at least a portion of a bottom perimeter of the safari bicycle rack;
    a crossbar forming a portion of the bottom safari bicycle rack bar, the crossbar having an elongate longitudinal length section with laterally curved end sections extending from each side of the longitudinal length, the crossbar having a top side that includes one or more bicycle receivers for mounting a bicycle thereto and having a length sufficient to extend across a roll cage of a vehicle; and
    a mounting bracket on an end of each laterally curved end section of the cross bar, the mounting brackets each being planar with an aperture extending through the bracket from a top surface to an opposite bottom surface, the mounting brackets each having a bottom surface adapted to be received on a surface of a longitudinal bar of the roll cage with a fastener extending through each aperture and a vertical hole in the longitudinal bars such that the crossbar is elevated off the longitudinal bars at a plane extending between the surfaces of the longitudinal bars.

2. The safari bicycle rack of claim 1, wherein the crossbar is elevated sufficiently such that the roll cage can include a soft top or bikini top without interference with the crossbar.

3. The safari bicycle rack of claim 1, wherein the crossbar forms a portion of the bottom safari bicycle rack bar that extends around the entire bottom perimeter of the safari bicycle rack.

4. The safari bicycle rack of claim 3, further comprising an upper safari rack bar extending around an upper perimeter of the safari bicycle rack above the bottom safari bicycle rack bar.

5. The safari bicycle rack of claim 4, wherein the bottom safari bicycle rack bar and the upper safari rack bar extend around a bottom article support portion of the safari bicycle creating a basket for holding the articles including luggage therein without interference from a supported bicycle.

6. The safari bicycle rack of claim 5, wherein the one or more bicycle receivers are disposed along the crossbar forming a rear portion of the safari bicycle rack such that bicycles are disposed behind the safari bicycle rack and over a rear portion of the vehicle when attached thereto.

7. The safari bicycle rack of claim 1, wherein each bicycle receiver includes a front fork bicycle mount attached to the crossbar at a rear location of the safari bicycle rack.

8. The safari bicycle rack of claim 7, wherein the location of each front fork bicycle mount positions a rear tire of an attached bicycle upon an upper edge of a rear tail gate of a vehicle to which the roll cage is attached.

9. The safari bicycle rack of claim 1, wherein each bicycle is disposed at a forward-facing and vertically angled position when attached to the safari bicycle rack.

10. The safari bicycle rack of claim 1, further comprising a strap for securing the rear tire of a bicycle to the vehicle.

11. The safari bicycle rack of claim 10, wherein the strap has length sufficient to be received through a rim of a spare tire mounted to the rear of the vehicle or to secure the rear tire to a rear bumper of the vehicle.

12. The safari bicycle rack of claim 1, wherein the safari bicycle rack includes a basket portion for supporting articles held therein above a passenger seating portion of the vehicle.

13. The safari bicycle rack of claim 1, wherein the safari bicycle rack does not use a rear trailer hitch of the vehicle for support.

14. A safari bicycle rack comprising:
    a rectangular safari rack portion including four sides and a base within which articles and/or luggage are to be carried;
    the rectangular safari rack including a lower bar extending about a periphery of the safari rack portion;
    a crossbar forming a portion of the lower bar of the safari rack and having a top side that includes one or more bicycle receivers for mounting a bicycle thereto, each bicycle receiver including a front fork mount for supporting a front fork of a bicycle, the rear tire of each bicycle being supported behind the front fork mount by an upper edge of a tailgate of a vehicle to which the safari bicycle rack is mounted; and at least four mounting brackets located near each corner of the rectangular safari rack, the mounting brackets each having a bottom surface adapted to be fastened to the vehicle.

15. A method of manufacturing a safari bicycle rack comprising:
    manufacturing a safari portion of the safari bicycle rack, the safari portion extending over a width and length of a passenger seating section of a vehicle to which the safari bicycle rack is to be attached, the safari portion including:
        base bars extending across a width and length of the safari rack designed to support one or more articles placed in the safari portion of the safari bicycle rack;
    manufacturing a bicycle rack portion of the safari bicycle rack, the bicycle rack portion including a crossbar having an elongate longitudinal length section with at least partially curved end sections extending from each side of the longitudinal length section and forming a portion of the safari portion of the safari bicycle rack, the crossbar having a top side that includes one or more bicycle receivers;
    manufacturing at least four mounting brackets at least two located on opposing sides of the safari bicycle rack, each mounting bracket disposed on a base of the safari bicycle rack and designed to attach to side bars of a roll cage of a vehicle.

16. A method of manufacturing a safari bicycle rack according to claim 15, wherein:
    dimensions of the safari bicycle rack are defined by a width of the roll cage to which safari bicycle rack is to be attached by the mounting brackets.

17. A method of manufacturing a safari bicycle rack according to claim 15, wherein dimensions of the bicycle rack portion are defined by a distance between a location of the crossbar at which the one or more bicycle receivers are located and a distance therefrom to an upper edge of a rear tailgate of the vehicle upon which a rear tire of a mounted bicycle is to be supported.

18. A method of manufacturing a safari bicycle rack according to claim 17, wherein the location of the one or more bicycle receivers and the location at the upper edge of the rear tailgate of the vehicle upon which the rear tire of the mounted bicycle places the bicycle in an inclined and forward facing position when attached to the safari bicycle rack.

19. A method of manufacturing a safari bicycle rack according to claim 17, wherein the position of the bicycle is suspended above a rear portion of the vehicle between the upper edge of the rear tailgate of the vehicle and the crossbar to which the front fork of each bicycle is attached.

20. The safari bicycle rack of claim 15, wherein the safari bicycle rack does not use a rear trailer hitch of the vehicle for support.

\* \* \* \* \*